(12) United States Patent
Besel et al.

(10) Patent No.: US 10,882,408 B2
(45) Date of Patent: Jan. 5, 2021

(54) MECHANICAL CONNECTORS FOR CONTACTLESS COMMUNICATION UNITS

(71) Applicant: Keyssa Systems, Inc., Campbell, CA (US)

(72) Inventors: Alan Besel, Ridgefield, WA (US); Stephan Lang, San Jose, CA (US)

(73) Assignee: KEYSSA SYSTEMS, INC., Campbell, CA (US)

( * ) Notice: Subject to any disclaimer, the term of this patent is extended or adjusted under 35 U.S.C. 154(b) by 392 days.

(21) Appl. No.: 15/685,356

(22) Filed: Aug. 24, 2017

(65) Prior Publication Data

US 2018/0062454 A1 Mar. 1, 2018

Related U.S. Application Data

(60) Provisional application No. 62/378,904, filed on Aug. 24, 2016.

(51) Int. Cl.
*H01R 13/62* (2006.01)
*B60L 53/14* (2019.01)
(Continued)

(52) U.S. Cl.
CPC ............... *B60L 53/14* (2019.02); *B60L 53/16* (2019.02); *B60L 53/305* (2019.02); *B60L 53/65* (2019.02); *H01F 38/14* (2013.01); *H01R 12/716* (2013.01); *H01R 13/6205* (2013.01); *H01R 13/6608* (2013.01); *H02J 7/00036* (2020.01); *H02J 7/0042* (2013.01); *H02J 7/025* (2013.01); *H02J 7/04* (2013.01); *H02J 50/10* (2016.02); *H02J 50/80* (2016.02); *H02J 50/90* (2016.02); *H04B 5/0031* (2013.01); *B60L 2270/38* (2013.01); *B60L 2270/40* (2013.01); *H01F 27/36* (2013.01); *H01F 2038/143* (2013.01); *H01F 2038/146* (2013.01); *H02J 7/0027* (2013.01); *Y02T 10/70* (2013.01); *Y02T 10/7072* (2013.01);
(Continued)

(58) Field of Classification Search
CPC .................................................. H01R 12/716
See application file for complete search history.

(56) References Cited

U.S. PATENT DOCUMENTS 5,071,363 A * 12/1991 Reylek ..................... H01R 4/26
439/290
5,938,455 A * 8/1999 Glovatsky .............. H01R 12/58
439/290

(Continued)

FOREIGN PATENT DOCUMENTS

WO 2013/162844 10/2013
WO 2015/023781 2/2015

*Primary Examiner* — Tho D Ta
(74) *Attorney, Agent, or Firm* — Van Court & Aldridge LLP

(57) ABSTRACT

Embodiments discussed herein refer to connectors that enable two structures or devices to be coupled together in a manner that enables consistent and reliable operation of contactless communications and power transfer. The connector integrates power and alignment such that when two connectors are coupled together the power connections are also responsible for connector alignment. The connector alignment ensures that contactless communication channels, spanning between the connectors, are aligned to enable consistent and reliable operation of contactless communications.

14 Claims, 26 Drawing Sheets

(51) Int. Cl.
*H01R 13/66* (2006.01)
*B60L 53/16* (2019.01)
*B60L 53/65* (2019.01)
*B60L 53/30* (2019.01)
*H02J 7/00* (2006.01)
*H01R 12/71* (2011.01)
*H02J 50/80* (2016.01)
*H02J 50/90* (2016.01)
*H02J 50/10* (2016.01)
*H01F 38/14* (2006.01)
*H02J 7/02* (2016.01)
*H02J 7/04* (2006.01)
*H04B 5/00* (2006.01)
*H01F 27/36* (2006.01)

(52) U.S. Cl.
CPC ................ *Y02T 90/12* (2013.01); *Y02T 90/14* (2013.01); *Y02T 90/16* (2013.01); *Y02T 90/167* (2013.01); *Y04S 30/14* (2013.01)

(56) References Cited

U.S. PATENT DOCUMENTS

| | | | | |
|---|---|---|---|---|
| 7,344,387 B2* | 3/2008 | Shiroyama | ............. | H01R 13/20 439/660 |
| 7,766,663 B2* | 8/2010 | Yazawa | ................ | H01R 12/716 439/63 |
| 8,469,722 B2* | 6/2013 | Huang | ................ | H01R 12/716 439/74 |
| 9,634,728 B2* | 4/2017 | Hassan-Ali | .......... | H04B 5/0031 |
| 2012/0178270 A1* | 7/2012 | McElroy | ................ | H01R 13/22 439/39 |
| 2012/0252231 A1* | 10/2012 | Kall | ................... | H01R 13/6205 439/39 |
| 2015/0048907 A1* | 2/2015 | Almgren | ............... | H04B 5/0031 333/24 R |
| 2016/0093999 A1* | 3/2016 | Powers | ................ | H01R 31/06 439/39 |
| 2016/0190736 A1* | 6/2016 | Chun | ................ | H01R 13/6205 439/39 |
| 2016/0241347 A1 | 8/2016 | McCormack et al. | | |

* cited by examiner

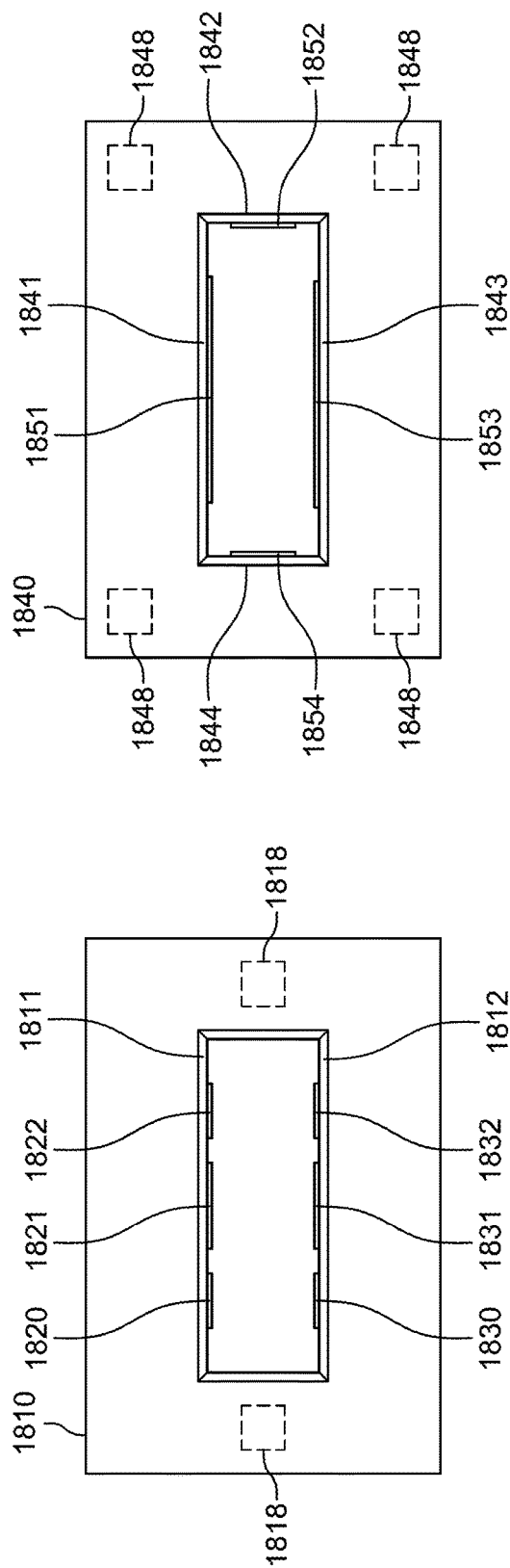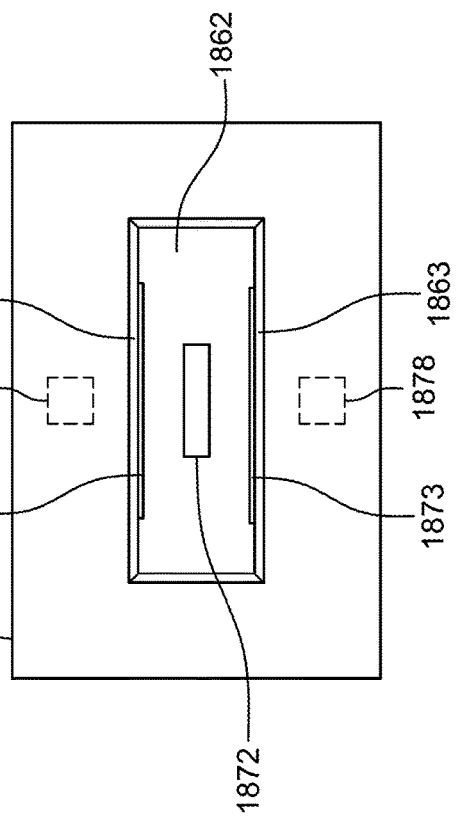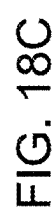

MECHANICAL CONNECTORS FOR CONTACTLESS COMMUNICATION UNITS

CROSS-REFERENCE TO A RELATED APPLICATION

This application claims priority to U.S. Provisional Application No. 62/378,904, filed Aug. 24, 2016, the disclosure of which is incorporated by reference in its entirety.

FIELD OF THE INVENTION

The present disclosure relates to mechanical connectors, and more particularly to mechanical connectors used in extremely high frequency ("EHF") systems.

BACKGROUND

Electronic devices can be "connected" together to enable data transfer between the devices. Typically, the connection between the two devices can be a cabled connection or a wireless connection. A cabled connection such as Universal Serial Bus (USB) is typically point-to-point, and requires mechanical connectors at each device, and a cable between the devices. A wireless connection such as WiFi or Bluetooth can operate in a "broadcast" mode, where one device can communicate simultaneously with several other devices, over a radio frequency (RF) link, typically in the range of 700 MHz-5.8 GHz.

Contactless connectors represent a different type of connector, compared to conventional cabled and wireless connectors, for transferring data between devices. Contactless connectors can be used for point-to-point contactless data communication between two devices and do not require electrical/mechanical couplings to enable data transfer. The contactless connectors of both devices merely need to be placed in close enough proximity to each other to enable contactless data transfer. Contactless data transfer is performed when contactless signals are transmitted from one device and received by a counterpart device. Since physical contact between the two devices is not required to conduct contactless data transfer, this can present alignment and power transfer challenges. Accordingly, what are needed are connector systems that ensure alignment for optimal contactless data transfer and power transfer.

BRIEF SUMMARY

Embodiments discussed herein refer to connectors that enable two structures or devices to be coupled together in a manner that enables consistent and reliable operation of contactless communications and power transfer. The connector integrates power and alignment such that when two connectors are coupled together the power connections are also responsible for connector alignment. The connector alignment ensures that contactless communication channels, spanning between the connectors, are aligned to enable consistent and reliable operation of contactless communications. Contactless communication units (CCU), which conduct contactless communications, may be integrated in the connectors at fixed positions relative to the integrated power and alignment structures. The integrated power and alignment structures serve as a common reference that enables CCUs of one connector to be aligned with CCUs of another connector when they are coupled together.

In one embodiment, a device is provided that includes a first connector operative to interface with a second connector associated with another device, wherein the second connector includes at least one contactless communications unit (CCU). The first connector includes a substrate, an integrated power and alignment structure coupled to the substrate, and at least one CCU coupled to the substrate in a position fixed relative to the integrated power and alignment structure. The integrated power and alignment structure can include at least one contact and an alignment member operative to interface with a counterpart alignment member of the second connector, and aligns the at least one CCU of the first connector to a respective one of the at least one CCU of the second connector.

In another embodiment, a first connector for use in being connected to a second connector including at least one contactless communications unit is provided. The first connector can include a substrate and an integrated power and alignment structure coupled to the substrate. The integrated power and alignment structure can include an alignment member operative to interface with a counterpart alignment member of the second connector, and a plurality of contacts arranged in an N×M matrix within the alignment member, wherein the plurality of contacts exhibit a contact force in the same direction as a coupling direction when the first and second connectors are connected together, wherein N is an integer of 1 or higher and M is an integer of 1 or higher. The first connector can include at least one CCU coupled to the substrate in a position fixed relative to the integrated power and alignment structure such that when the first and second connectors are connected together, the integrated power and alignment structure aligns the at least one CCU of the first connector to a respective one of the at least one CCU of the second connector. The first connector can include at least one magnet secured to the substrate to provide a retention force that secures the first and second connectors together and to overcome a contact force of the plurality of connectors.

In yet another embodiment, a multiple protrusion connector for use in being connected to a multiple cavity connector comprising at least one contactless communications unit is provided. The multiple protrusion connector can include a substrate, a plurality of integrated power and alignment structures coupled to the substrate, each of the integrated power and alignment structures including a protrusion member operative to interface with a counterpart cavity of the second connector, and a contact integrated within the protrusion member. The multiple protrusion connector can include at least two CCUs coupled to the substrate in positions fixed relative to the plurality of integrated power and alignment structure such that when the first and second connectors are connected together, the integrated power and alignment structure aligns the at least two CCUs of the first connector to a respective one of the at least one CCU of the second connector, and at least one magnet secured to the substrate to provide a retention force that secures the first and second connectors together and to overcome a contact force of the plurality of connectors.

In yet another embodiment, a device can include a housing, a circuit board positioned a fixed distance from the housing, a first connector coupled to the housing and operative to interface with a second connector associated with another device, wherein the second connector includes at least one contactless communications unit (CCU). The first connector can include an integrated power and alignment structure including a plurality of contacts, and an alignment member operative to interface with a counterpart alignment member of the second connector. The device can include at least one CCU mounted on the circuit board in a position fixed relative to the integrated power and alignment structure such that when the first and second connectors are coupled together, the integrated power and alignment structure aligns the at least one CCU of the first connector to a respective one of the at least one CCU of the second connector.

A further understanding of the nature and advantages of the embodiments discussed herein may be realized by reference to the remaining portions of the specification and the drawings.

BRIEF DESCRIPTION OF THE DRAWINGS

FIGS. 18A-18C show different illustrative top view of connectors with different contact positions, according to various embodiments;

DETAILED DESCRIPTION

Figure 1:
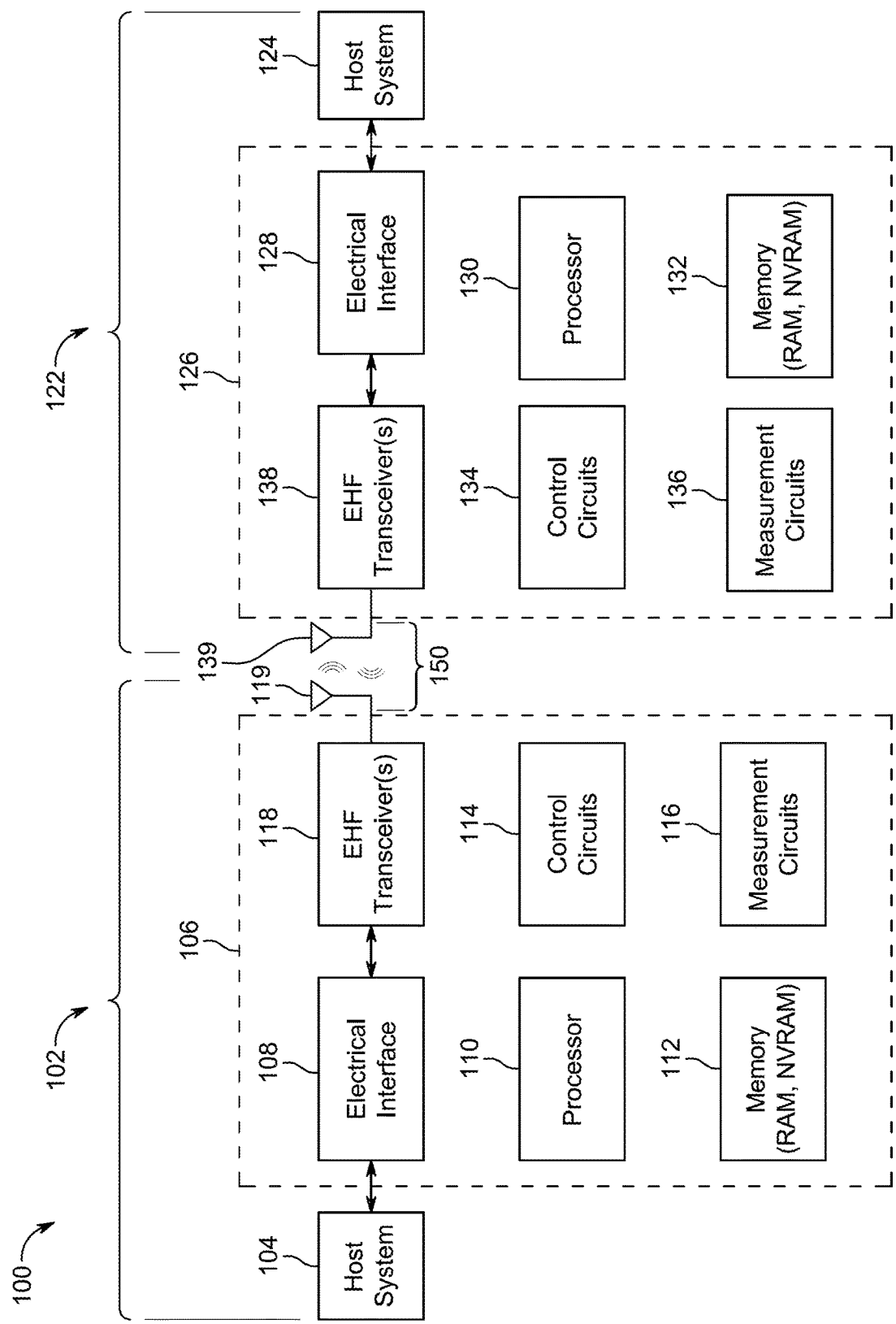
FIG. 1 illustrates a communications system, according to an embodiment.

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices are important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip. Throughout this disclosure, the terms comm-link chip, and comm-link chip package are used to refer to EHF antennas embedded in IC packages. Comm-link chips are an example of a communication device, also referred to as contactless communication unit, a contactless communications transceiver unit (CCTU or EHF XCVR).

The term "transceiver" may refer to a device such as an integrated circuit ("IC") including a transmitter (Tx) and a receiver (Rx) so that the integrated circuit may be used to both transmit and receive information, such as data. Such a transceiver may be referred to herein as a CCU or an EHF XCVR. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to electromagnetic (EM) rather than electrical (wired, contact-based) connections and transport of signals between entities (such as devices). As used herein, the term "contactless" may refer to a carrier-assisted, dielectric coupling system. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF XCVRs described herein may be designed to adhere to various requirements mandated by one or more governments or their agencies. For example, the FCC may promulgate requirements for certification for transmitting data in an RF frequency band.

"Standards" and related terms such as "Standards-based", "Standards-based interfaces", "Standards-based protocol", "interface protocols," and the like may refer to legacy interface standards which may include but are not limited to USB (e.g., USB 2, USB 3, USB 3/2, or USB OTG), DisplayPort (DP), Thunderbolt, HDMI, SATA/SAS, PCIe, Ethernet SGMII, Hypertransport, Quickpath, I2S, GPIO, I2C and their extensions or revisions. For example, the term "interface protocol" may refer to the protocol being used by one system to communicate with another system. As a specific example, the interface protocol being used by a system may be a USB interface protocol; as such, the system may communicate according to the rules governing USB communications.

When transferring data between EHF communication units, the transfer speed and quality are optimal when an Rx is placed in the signal path where the Tx radiates maximum signal strength. Thus, higher data transfer efficiency is realized when the Rx and Tx are properly aligned with respect to each other. In addition, use of a reflective lens according to embodiments discussed herein can further increase the efficiency of data transfer by focusing dispersal of the EM signal energy.

FIG. 1 illustrates a communications system 100, wherein two electronic device subsystems or devices 102 and 122 may communicate with one another over at least one contactless communications link 150. Data may be transferred in at least one direction, from first device 102, which may be regarded as a source for sending the data to be transferred, to second device 122, which may be regarded as a destination for receiving the data to be transferred. With reference to FIG. 1, the transfer of data from first device 102 to second device 122 may be described. However, it should be understood that data may alternatively or additionally be transferred from second device 122 (e.g., acting as a source for sending the data) to first device 102 (e.g., acting as a destination for receiving the data), and that information may also be exchanged in both directions between devices 102 and 122 during a given communications session.

For illustrative clarity, devices 102 and 122 will be described as mirror images of one another, but it should be understood that the two devices 102 and 122 may be different from each other. For example, one of the devices may be a laptop computer or surface computer and the other device may be a mobile telephone or other portable device. Some examples of electronic devices which may benefit from the techniques disclosed herein may include cellular telephones (or handsets, or smart phones), computers, docks (e.g., docking stations), laptops, tablets, or comparable electronic devices, to name but a few.

First electronic device 102 may include a host system 104 and a contactless communication unit 106, which may be an EHF contactless communication unit, a smart contactless connector, a communication subsystem, a smart connector, a contactless connector, or simply a connector 106. The unit 106 associated with first device 102 may be generally capable of performing at least one of establishing and managing operation of contactless link 150 with unit 126 of second device 122, monitoring and modifying data passing through unit 106 onto link 150, and/or interfacing with and providing application support for host system 104. These functions of unit 106, with regard to interacting with link 150, the data, and host system 104, may be described and elaborated upon and discussed in greater detail in this disclosure.

Unit 106 associated with first device 102 may include some or all of the following elements: electrical interface 108, processor 110 and associated memory 112, control circuits 114, measurement circuits 116, one or more transceivers 118, and/or one or more transducers 119. The operation of these various elements (108-119) may be described and elaborated upon and discussed in greater detail in this disclosure.

Second electronic device 122 may include host system 124 and a contactless communication unit 126, which may be an EHF contactless communication unit, a smart contactless connector, a communication subsystem, a smart connector, a contactless connector, or simply a connector 126. Connector 126 associated with second device 122 may be generally capable of establishing and managing operation of contactless link 150 with unit 106 of first device 102, monitoring and modifying data passing through the unit 126 onto link 150, and/or interfacing with and/or providing application support for host system 124. These functions of unit 126, with regard to interacting with link 150, the data, and the host system 124, may be described and elaborated upon and discussed in greater detail in this disclosure.

Unit 126 associated with second device 122 may include some or all of the following elements: an electrical interface 128, processor 130 and associated memory 132, control circuits 134, measurement circuits 136, one or more transceivers 138, and/or one or more transducers 139. The operation of these various elements (128-139) may be described and elaborated upon and discussed in greater detail in this disclosure.

Units 106 and 126 may operate without intervention from host processors (e.g., processors of host systems 104 and 124, respectively), and/or may take control of the host systems 104 and 124, respectively, or portions thereof. Units 106 and 126 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (e.g., in FIG. 1) around units 106 and 126 may simply represent "partitioning" of functions, separating (e.g., distinguishing) units 106 and 126 from host system 104 and 124, respectively. The antennae shown (e.g., symbolically as transducers 119 and 139)

outside of the dashed-line rectangles may be considered to be within the functional blocks of units 106 and 126, but may be disposed either internal or external to a communications chip constituting the contactless connector (e.g., for receiving EHF contactless signals from another antennae/ transducer (e.g., across link 150)). The dashed-line rectangles shown (e.g., in FIG. 1) around units 106 and 126 may also represent non-conducting barriers (e.g., housings, enclosures, or the like, not shown), such as plastic or acrylic enclosures for units 106 and 126 or could also include entire devices 102 and 122, respectively, as described hereinabove.

Electrical interfaces 108 and 128 may include communications port(s)/channel(s) to communicate with any suitable portion(s) of host systems 104 and 124, respectively. Host systems 104 and 124 may have their own processors and associated circuitry (e.g., as described below with respect to FIG. 2 but not shown in FIG. 1). As mentioned, devices 102 and 122 may be described as mirror images of one another, but it should be understood that the two devices 102 and 122, and/or the two host systems 104 and 124, may be different than each other. For example, one of the devices or host systems may be a laptop computer, and the other device or host system may be a mobile telephone or an adapter for a mobile telephone. Some examples of electronic devices which may benefit from the techniques disclosed herein may include cellular telephones (or handsets, or smart phones), computers, docks (e.g., docking stations), laptops, tablets, or comparable electronic devices, to name but a few.

Processors 110 and 130 may be embedded microprocessors, or microcontrollers, or state machines, may run management operating systems (OSs) for the connection, and/or may have built-in authentication/encryption engines. Processors 110 and 130, either alone or in combination with other elements presented herein, may be operative to manage the communications link, to monitor data passing through the units and over the communications link, and/or to provide application support for a host system, or to execute one or more state machines, or variations thereof as may become evident from the several functional descriptions set forth herein. In a broader sense, units 106 and 126 may be capable of performing one or more of (at least one of) the various functions described herein.

Memory 112 and 132 may be any suitable memory, such as random access memory (RAM), non-volatile RAM (NVRAM, such as flash memory), or the like, and may include registers containing configuration, status, permissions, content permissions, keys for authentication/encryption, application(s) (e.g., software and/or firmware for use by processors 110 and 130), and the like.

Control circuits 114 and 134 may include any suitable circuitry that may be capable of monitoring the state of the link and/or actively appending to or changing data concurrently ("on-the-fly") as it goes through unit 106 or 126, respectively.

Measurement circuits 116 and 136 may include any suitable circuitry that may be capable of observing (e.g., monitoring) the connection state/status, the connection type, and/or the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas 119 and 139) that may be suitable for converting between electrical signals (e.g., for the host system) and EM signals (e.g., for the contactless communications link). Transceivers 118 and 138 may each be a half-duplex transceiver that can asynchronously convert a baseband signal into a modulated EHF carrier, which may be radiated from an internal or external antenna (e.g., as shown schematically), or can receive and demodulate the carrier and reproduce the original baseband signal. The EHF carrier may penetrate a wide variety of commonly-used non-conductive materials (e.g., glass, plastic, etc.).

It should be understood that if only one-way communication is required, such as from first device 102 to second device 122, transceiver 118 could be replaced by a Tx and transceiver 138 could be replaced by a Rx.

Transmit power and receive sensitivity for transceivers 118 and 138 may be controlled to minimize electromagnetic interference (EMI) effects and/or to simplify FCC certification, if appropriate.

Transceivers 118 and 138 may be implemented as IC chips comprising a Tx, a Rx, and related components. Transceiver chip(s) may be packaged in a conventional manner, such as in ball grid array (BGA) format. The antenna may be integrated into the package, or may be external to the package, or may be incorporated onto the chip itself. An exemplary unit 106, 126 may include one, two, or more transceiver chips. Some features or characteristics of transceivers 118 and 138 may include low latency signal path, multi-gigabit data rates, link detection, and/or link training. The signals transmitted by transceivers 118 and 138 may be modulated in any suitable manner to convey the data being transferred from one device to the other device, some non-limiting examples of which are presented herein. Modulation may be OOK (on/off keying), ASK (amplitude shift keying), PSK (phase shift keying), QPSK (quadrature phase shift keying), QAM (quadrature amplitude modulation), or other suitable modulation techniques. Signals may be encoded and packetized and transmitted by one transceiver (e.g., transceiver 118), and received and unpacketized and decoded by another transceiver (e.g., transceiver 138). Out-of-band signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (e.g., fingerprinted), which may enable a later forensic analysis to be performed for digital rights management. For example, protected (e.g., premium) content could be freely (e.g., unimpededly) transferred from one device to another, but the transaction could be traced to the specific devices involved, so that the participants in the transaction can be held accountable (e.g., billed). Premium protected content may be modified, data appended thereto, and/or can be logged with chip ID, user ID, or by other means.

Communications link 150 may be a contactless link, and the first and second units 106 and 126 may be contactless connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Standards controllers, including Ethernet, may not be immediately apparent in that both may handle data flow between a host system and a communications link. However, a distinction between the contactless connectors disclosed herein and exemplary Standards controllers may be that the contactless connectors disclosed herein may both set up the contactless communications link and transfer data from a host system directly onto the contactless communications link, without the intermediary, for example, of mechanical connectors and/or a cable that utilize an electrical conduction medium rather than an RF medium. Further distinctions may be made in the way that the contactless connectors disclosed herein may be capable of operating independently and/or transparently from the host system, without requiring host awareness or interaction.

Data transfer between electronic devices 102 and 122 may be implemented over a contactless RF EM communications link 150, which may be handled substantially entirely by the units 106 and 126 of first and second devices 102 and 122, respectively. Signals flowing between units 106 and 126 of devices 102 and 122 may occur electromagnetically over a non-electrical (e.g., dielectric) medium, such as an air gap, waveguide, plastics (e.g., polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides. Alternatively, the signals may pass by way of a slot antenna in a conductive medium, where the slot antenna may direct the contactless connectivity in a desired direction. A device (e.g., at least the contactless connector) may be substantially fully enclosed by a conductive medium other than at a location where it may be desired to emit and/or receive EHF radiation from a partner device (e.g., at least the contactless connector thereof), which may also be similarly substantially fully enclosed by a conductive medium.

Due to the high data rate enabled by the EHF contactless communication unit, large data files, such as movies, audio, device images, operating systems, and the like may be transferred in very short periods of time in contrast with existing technologies such as NFC (near field communications). As an example, a 1 Gigabyte data file may be transferred in as little as 2 seconds. The electromagnetic communication may typically be over an air gap that may be limited to a short range, such as, for example, 0-5 cm. A dielectric medium, such as a dielectric coupler, may be used to extend the range of the contactless link between the devices 102 and 122 to several centimeters, meters, or more.

It should be understood that in this, and any other embodiments of contactless links discussed herein, an overall communications system may be implemented as a combination of contactless and physical links. Furthermore, some of the techniques described herein may be applied to transferring data over a physical link. In such a link, the transceiver can contactlessly transmit data to a cable that may serve as a physical conduit for the data.

One or both of devices 102 and 122 may have two or more transceivers. Having two or more transceivers may support a feedback loop, full duplex operation, and/or may simultaneously establish a second communications link (e.g., for communicating with the host system). An exemplary "data flow" may proceed as follows: data originating from host system 104 or data originating at unit 106 may be provided by unit 106, via its transceiver 118 and transducer 119, onto the communications link 150. The data may pass through or over communications link 150. Data received from the communications link 150 by transducer 139 and transceiver 138 of unit 126 may be provided to host system 124 or may remain with unit 126. Data may flow in the reverse direction, from host system 124 via unit 126 or originating at unit 126, onto the contactless link 150 to unit 106 which may pass the data to host system 104. Although not shown, each one of units 106 and 126 may include one or more suitable busses for communicating data and/or power between various components 108-119 and/or between various components 128-139.

Figure 2:
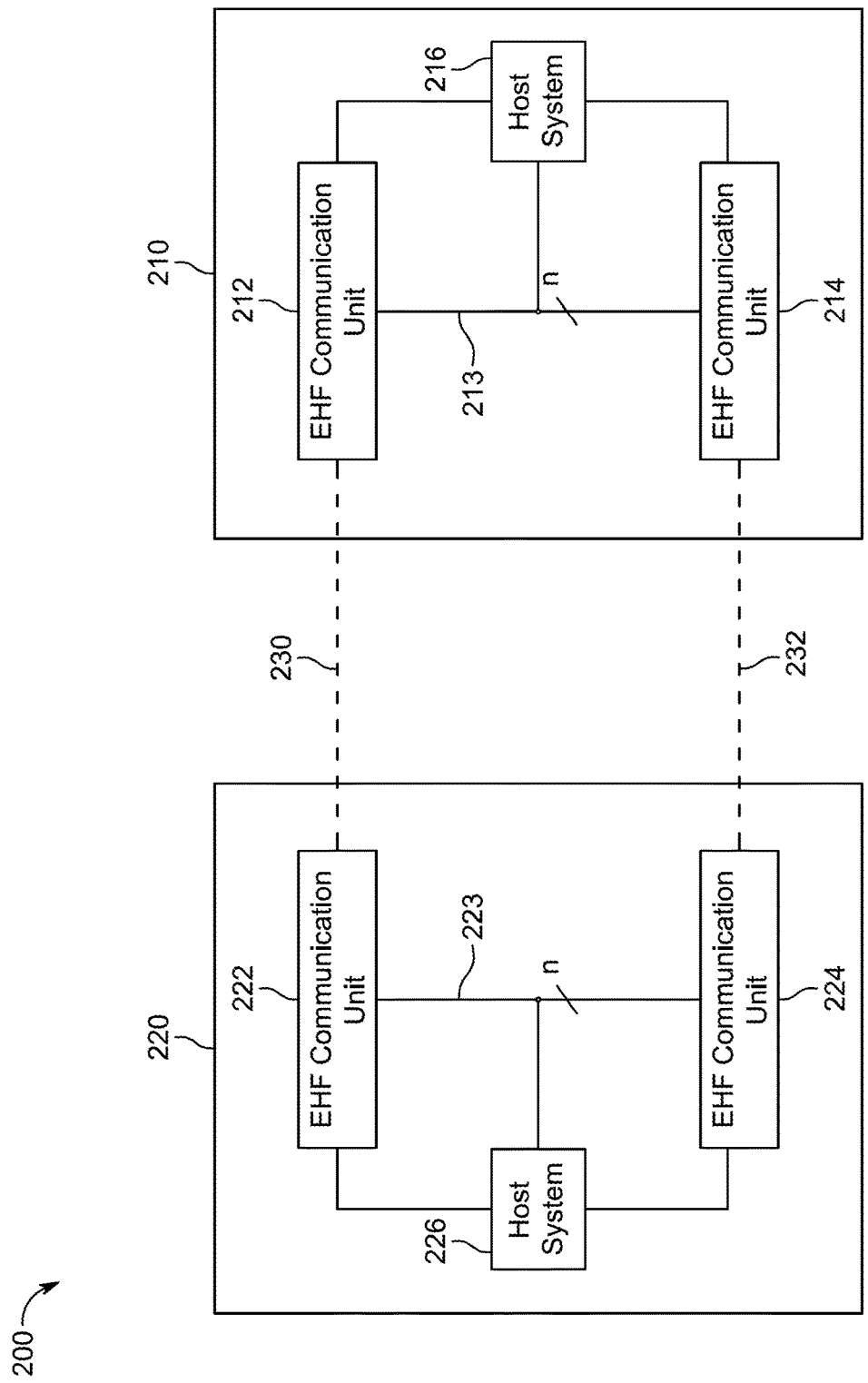
FIG. 2 illustrates a communications system having two electronic devices that communicate with one another over two or more contactless communications links, according to an embodiment.

FIG. 2 illustrates a communications system 200 wherein two electronic device subsystems or devices 210 and 220 may communicate with one another over two or more contactless communications links, according to an embodiment. System 200 may be similar to system 100 in many respects but, for illustrative and simplified discussion purposes, shows that each device may include two EHF communication units. Moreover, any EHF communication unit in system 200 may be the same or substantially the same as any EHF communication unit in system 100. As such, a more simplified representation of units 106 and 126 is shown in FIG. 2. If desired, each device can include several EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective subsystems or devices, and may thereby enable subsystems or devices 210 and 220 to operate for their intended functionality. In another embodiment, wired paths 213 and 223 may instead be EHF contactless communications links.

In some embodiments, each of EHF communication units 212, 214, 222, and 224 can be the same as EHF communication unit 106 or 126, discussed above. As such, EHF communication units 212, 214, 222, and 224 may include transceivers that may be capable of being configured to transmit and/or receive EHF signals. For example, in one approach, units 212 and 224 can be configured to receive EHF signals and units 214 and 222 can be configured to transmit EHF signals. Thus, in this approach, a contactless communications link 230 may exist between EHF communication units 222 and 212, and a contactless communications link 232 may exist between EHF communication units 214 and 224. As shown, units 212 and 222 may work together as a coupled pair of units that may communicate via link 230, and units 214 and 224 may work together as another coupled pair of units that may communicate via link 232. If one or more additional coupled pairs of units were to be included in system 200, then additional communications links would also exist.

After the EHF contactless communication units progress through their respective state machines and establish the links, and data no longer needs to be communicated across the links, the units can enter in a power savings state or data transport idle state depending on whether they are being implemented as a Tx or Rx unit. The power savings state may enable an EHF communication unit to power down selective circuitry, after the EHF communication link has been established, when there may be no data to be communicated over the link. The Tx unit may transmit a "keep alive" signal to the Rx unit to prevent it from timing out and exiting out of its power savings state. The Rx unit may be periodically turned on to monitor whether the Tx is sending the "keep alive" signal. The Tx and Rx units may transition to a new state (e.g., a data transport state) when they receive instructions to do so. As a specific example, an apparatus can include an EHF transceiver and control circuitry. The control circuitry may be operative to control establishment of an EHF communications link with another apparatus by executing a state machine that may transition from state to state in response to satisfaction of any one of a plurality of conditions, establish the EHF communication link with the apparatus to selectively enable one of transmission and reception of data, after the EHF communication link with the apparatus may be established, monitor an absence of data being communicated over the EHF communication link, and enter into a power savings state in response to the monitored absence of data being communicated over the EHF communication link until the state machine transitions to a new state.

Both devices 210 and 220 have the ability to control activation and deactivation of the links existing between the two devices. For example, if the links are in a power savings mode, and device 210 decides it wishes to transmit data to device 220, device 210 may change a signal state on one of the pins of one of its EHF units to bring it out of sleep and into an active data transport ready state. In response to the change in signal state, it may transmit a signal over the contactless communications link to its counterpart EHF unit, which may exit out of its power state and enter into an active data transport state. In addition, the counterpart EHF unit may inform other circuitry within device 220 that incoming data traffic is about to commence and that any appropriate changes are put into effect so that the data can be handled properly. For example, in the context of various embodiments described herein, when the counterpart EHF unit is contained in an adapter device that is electrically coupled to a user device, the counterpart EHF unit may provide a signal that causes adapter circuitry to turn off an active connection coupling a memory to the user device and activate a connection coupling the memory to the EHF unit.

Figure 3:
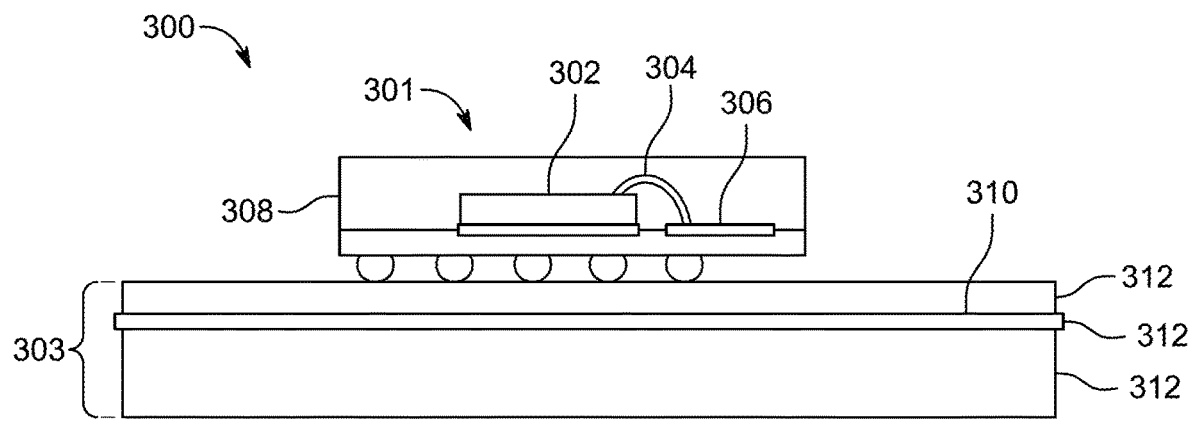
FIG. 3 is a side view of an exemplary EHF communication circuit showing a simplified view of some structural components.

FIG. 3 is a side view of an exemplary EHF communication circuit 300 showing a simplified view of some structural components. As illustrated, the communication circuit may include an integrated circuit package 301 that includes die 302 mounted on connector printed circuit board (PCB) 303, a lead frame (not shown), one or more conductive connectors such as bond wires 304, a transducer such as antenna 306, and an encapsulating material 308.

Die 302 may include any suitable structure configured as a miniaturized circuit on a suitable die substrate, and is functionally equivalent to a component such as a chip or an integrated circuit (IC). The die substrate may be formed using any suitable semiconductor material, such as, but not limited to, silicon. Die 302 may be mounted in electrical communication with the lead frame. The lead frame may be any suitable arrangement of electrically conductive leads configured to allow one or more other circuits to operatively connect with die 302. The leads of the lead frame may be embedded or fixed in a lead frame substrate. The lead frame substrate may be formed using any suitable insulating material configured to substantially hold the leads in a predetermined arrangement.

Further, the electrical communication between die 302 and leads of the lead frame may be accomplished by any suitable method using conductive connectors such as, one or more bond wires 304. Bond wires 304 may be used to electrically connect points on a circuit of die 302 with corresponding leads on the lead frame. In another embodiment, die 302 may be inverted and conductive connectors including bumps, or die solder balls rather than bond wires 304, which may be configured in a flip chip arrangement. Transducer 306 may be any suitable structure configured to convert between electrical and electromagnetic signals. In some embodiments, transducer 306 is an antenna. Transducer 306 in conjunction with the circuitry on die 302 may be configured to operate in an EHF spectrum, and may be configured to transmit and/or receive electromagnetic signals, in other words as a transmitter, a receiver, or a transceiver. In an embodiment, transducer 306 may be constructed as a part of the lead frame. IC package 301 may include more than one transducer 306. In another embodiment, transducer 306 may be separate from but operatively connected to die 302 by any suitable method, and may be located adjacent to die 302. For example, transducer 306 may be connected to die 302 using bond wires. Alternatively, in a flip chip configuration, transducer 306 may be connected to die 302 without the use of the bond wires. In other embodiments, transducer 306 may be disposed on die 302 or on PCB 303.

Encapsulating material 308 may hold the various components of IC package 301 in fixed relative positions. Encapsulating material 308 may be any suitable material configured to provide electrical insulation and physical protection for the electrical and electronic components of the IC package. For example, encapsulating material 308 may be a mold compound, glass, plastic, or ceramic. Encapsulating material 308 may be formed in any suitable shape. For example, encapsulating material 308 may be in the form of a rectangular block, encapsulating all components of the IC package except the unconnected leads of the lead frame. One or more external connections may be formed with other circuits or components. For example, external connections may include ball pads and/or external solder balls for connection to a printed circuit board.

IC package 301 may be mounted on a connector PCB 303. Connector PCB 303 may include one or more laminated layers 312, one of which may be a PCB ground plane 310. PCB ground plane 310 may be any suitable structure configured to provide an electrical ground to circuits and components on the IC package. With the placement of the ground layer, at an appropriate distance from the antenna, the electromagnetic radiation pattern may be directed outwards from the substrate.

Figure 4:
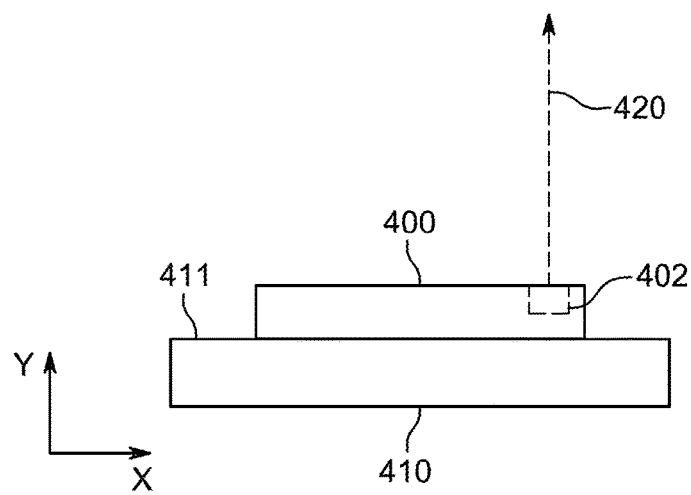
FIG. 4 shows a simplified and illustrative EHF CCU mounted to a substrate, according to an embodiment.
Figure 5:
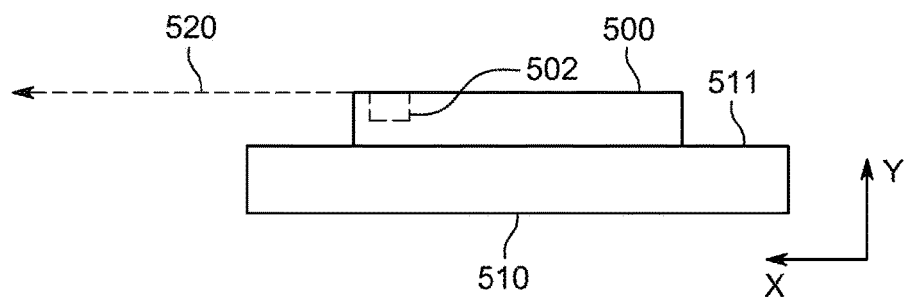
FIG. 5 shows another simplified and illustrative EHF CCU mounted to a substrate, according to an embodiment.

FIG. 4 shows a simplified and illustrative EHF CCU 400 mounted to substrate 410, according to an embodiment. CCU 440 may include transducer 402 that is designed to transmit contactless EHF signals in the direction of signal path 420. Path 420 projects in a direction perpendicular to surface 411 of substrate 410. In other words, path 420 projects in the Y-axis direction. The direction of signal path 420 is merely illustrative. For example, the signal path can be directed in any suitable direction. For example, FIG. 5 shows a simplified and illustrative EHF CCU 500 mounted to substrate 510. CCU 500 may include transducer 502 that is designed to transmit contactless EHF signals in the direction of signal path 520. Path 520 projects in a direction co-planar to surface 511 of substrate 510. In other words, path 520 projects in the X-axis direction.

Thus, although it may be desirable for EHF signals to be transmitted along a desired signal path (e.g., such a path 420 or 520), non-directed, free flowing EHF signal energy may emit in all directions, thereby resulting in radiation patterns that are not confined to the desired signal path. Non-directed transmission of EHF signals in undesired directions may cause cross-talk. Such cross-talk may exist over-the-air, within circuit boards, and/or within device housings. In addition, non-directed transmission of EHF signals may also result in reduced signal strength, thereby potentially making it more difficult for receiving CCUs to capture the EHF signals.

Figure 6:
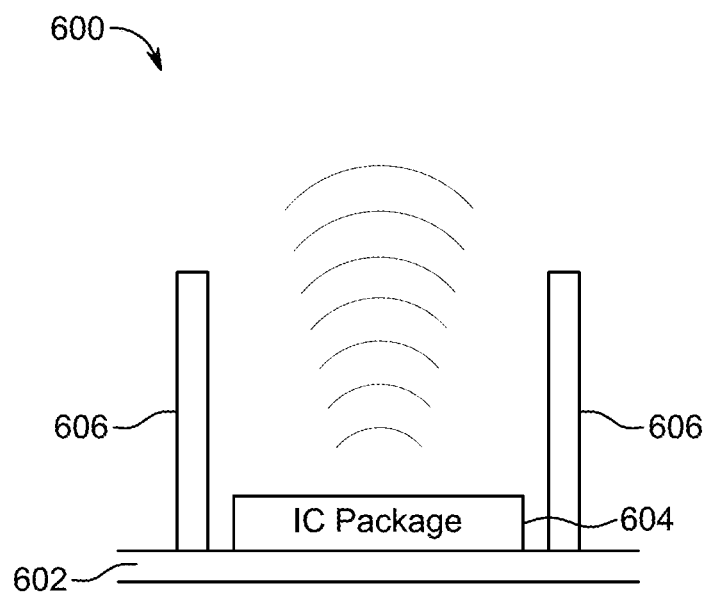
FIG. 6 illustrates one IC package mounted to a printed circuit board, according to an embodiment.

FIG. 6 illustrates one IC package 604 mounted to the PCB 602. However, in other implementations, more than one IC package can be mounted to the same PCB 602. The communication module 600 can be part of a communication system of a device, e.g., a computer, mobile phone, tablet, kiosk, or other device/system. Signal guiding structure 606 extends upward from PCB 602. The communication system can be configured to provide wireless communication using one or more IC packages. For example, the communication system can include two IC packages, one configured as a transmitter and the other configured as a receiver. The communication system can be in communication with a storage device. Thus, for example, the communication system can transfer data between the data storage unit and an external device using wireless communication provided by the IC packages.

Figure 7:
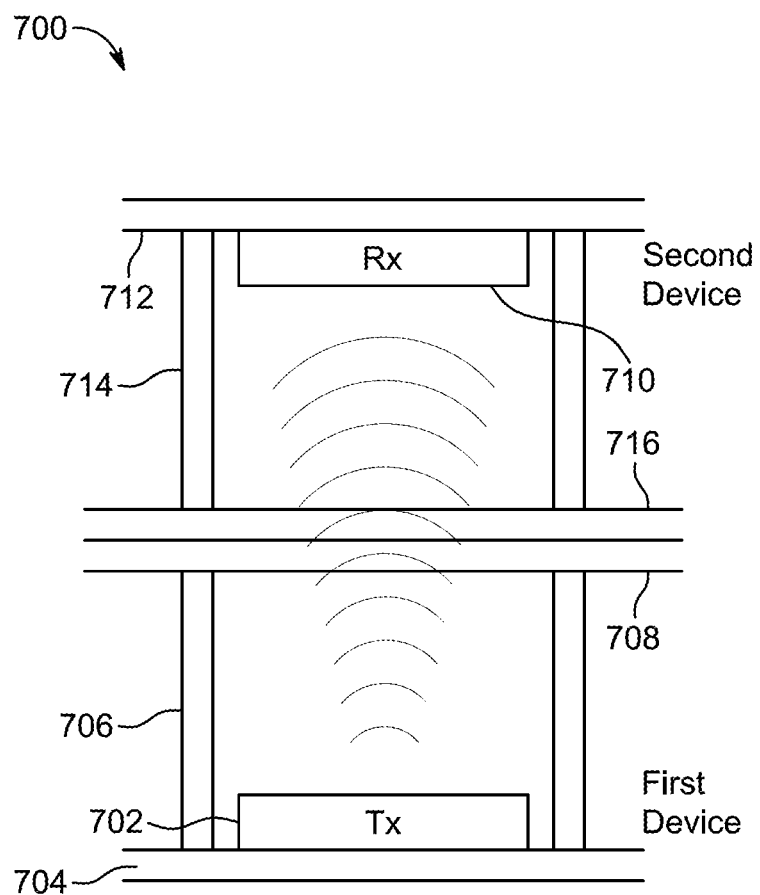
FIG. 7 is a side view diagram illustrating an example of communication between a transmitter and a receiver, according to an embodiment.

FIG. 7 is a side view diagram 700 illustrating an example of communication between a transmitter and a receiver. For example, a first device may exchange data with a second device. The two devices can be positioned in proximity to each other such that the respective communication modules for transmitting and receiving data are aligned and in range of each other. In particular, for EHF frequencies, the devices may be very close to each other to optimize transmission. For example, the external housing of the devices may need to be in physical contact to facilitate data communication.

In FIG. 7, a first device includes a first communication module having a transmitter IC package 702 positioned on a first PCB 704. The transmitter IC package 702 is surrounded by a first signal guiding structure 706 forming a channel. The first signal guiding structure 706 extends to a surface of a first housing 708 of the first device. For example, the first device can be a first mobile phone and the first housing 708 can correspond to the outer case of the first mobile phone.

A second device includes a second communication module having a receiver IC package 710 positioned on a second PCB 712. The receiver IC package 710 is surrounded by a second signal guiding structure 714 forming a channel. The second signal guiding structure 714 extends to a surface of a second housing 716 of the second device. For example, the second device can be a second mobile phone and the second housing 716 can correspond to the outer case of the second mobile phone.

As illustrated by diagram 700, the first signal guiding structure 706 and the second signal guiding structure 714 are aligned and an outer surface of the first housing 708 and the second housing 716 are in physical contact to provide minimal communication distance and interference. A data transmission from the transmitter IC package 702 passes along the first signal guiding structure 706 and the second signal guiding structure 714 to the receiving IC package 710.

Figure 8:
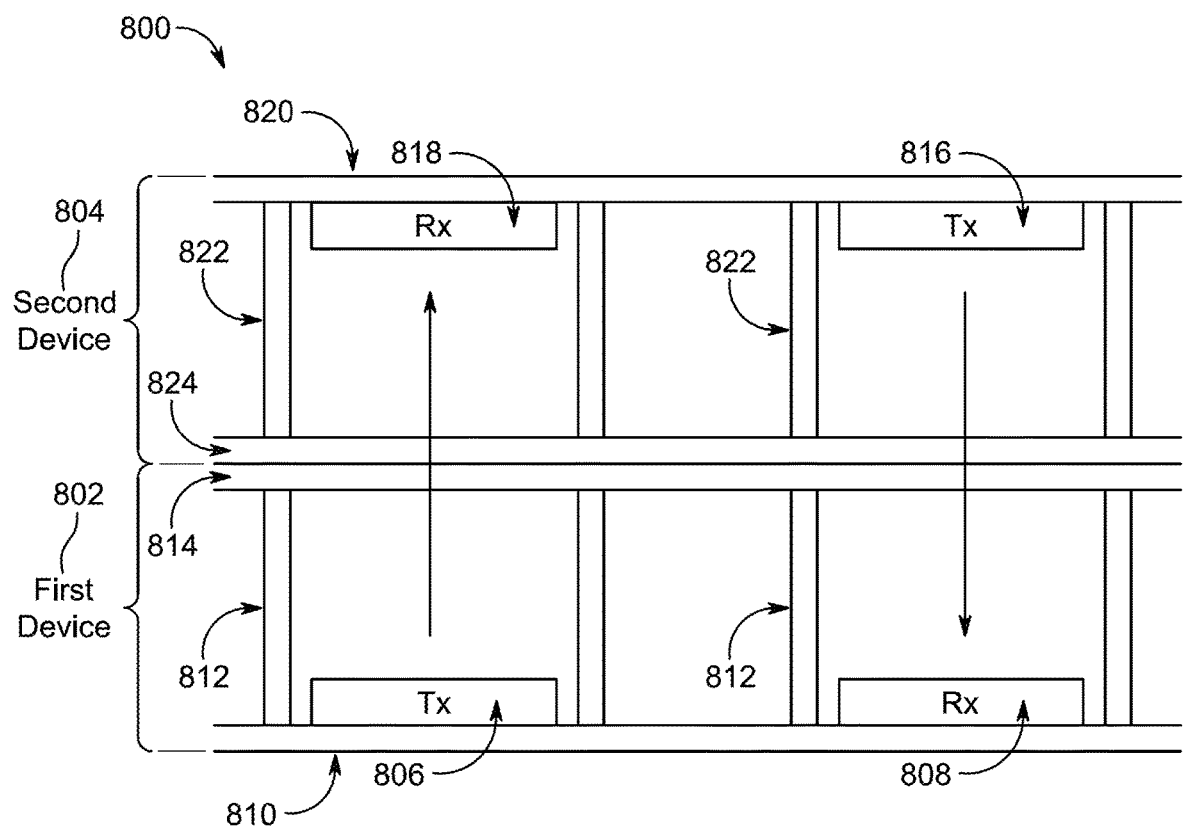
FIG. 8 shows a side view diagram illustrating an example of communication between a pair of transmitters and receivers, according to an embodiment.

FIG. 8 shows a side view diagram 800 illustrating an example of communication between a pair of transmitters and receivers. Diagram 800 includes a portion of a first device 802 and a second device 804. The first device 802 includes a first transmitter IC package 806 and a first receiver IC package 808 mounted to a first PCB 810. Each of the first transmitter IC package 806 and the first receiver IC package 808 is encircled by a respective first signal guiding structure 812. The first signal guiding structure 812 forms a channel extending to a surface of a first housing 814 of the first device 802. For example, the first device 802 can be a first mobile phone and the first housing 814 can correspond to the outer case of the first mobile phone. The second device 804 includes a second transmitter IC package 816 and a second receiver IC package 818 mounted to a second PCB 820. Each of the second transmitter IC package 816 and the second receiver IC package 818 is encircled by a respective second signal guiding structure 822. The second signal guiding structure 822 provides a channel extending to a surface of a second housing 824 of the second device 802. For example, the second device 802 can be a second mobile phone and the second housing 824 can correspond to the outer case of the second mobile phone. As shown in FIG. 8, the first signal guiding structures 812 and the second signal guiding structures 822 are substantially aligned on either side of the respective first and second housings 814, 824. The alignment minimizes data transmission loss from the first transmitter IC package 806 to the second receiver IC package 818 and from the second transmitter IC package 816 to the first receiver IC package 808.

Figure 9:
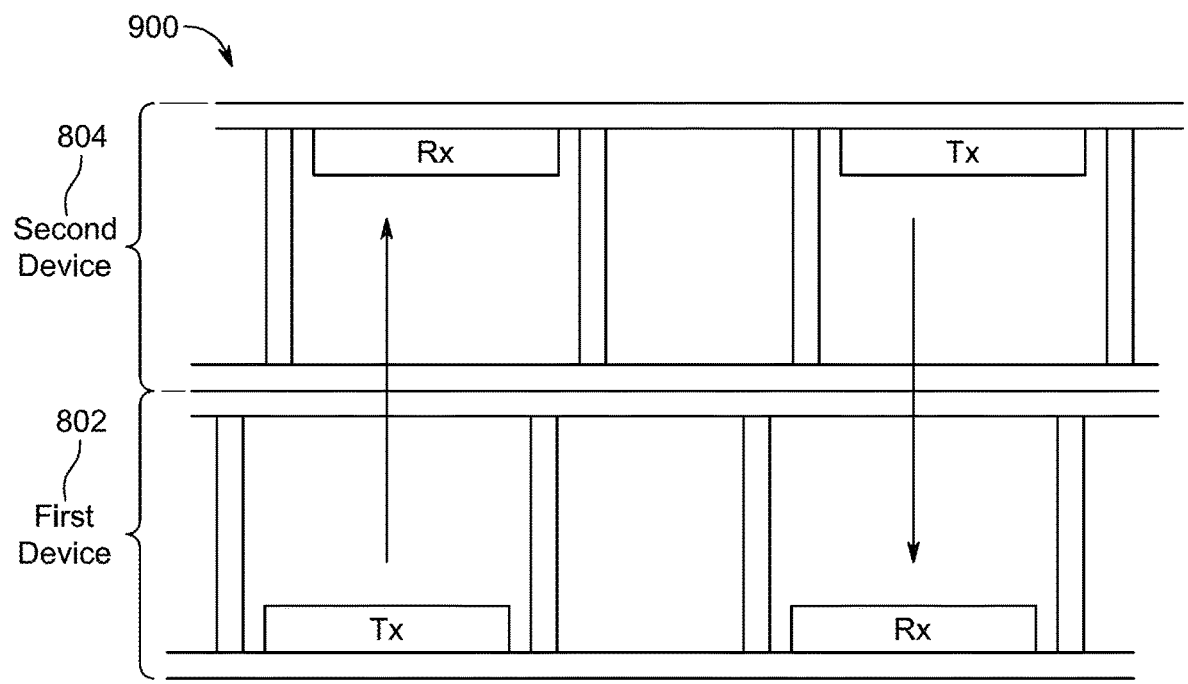
FIG. 9 shows a side view diagram illustrating an example of a misaligned pair of transmitters and receivers, according to an embodiment.

By contrast, FIG. 9 shows a side view diagram 900 illustrating an example of a misaligned pair of transmitters and receivers. In particular, diagram 900 illustrates the portion of the first device 802 and the second device 804 of FIG. 8 where the respective signal guiding structures are not aligned with another. For example, the first device 802 and second device 804 may both be mobile devices. When placed next to each other to communicate data, the devices may not be aligned perfectly, which may mean that the signal guiding structures are not aligned with one another within a specified tolerance.

For example, the transmitter and receiver IC packages of each device can operate in the EHF band and require a high degree of alignment to prevent signal degradation or loss. In some implementations, the signal guiding structures are preferably aligned within 0.5 mm. Thus, even a small amount of misalignment can result in signal loss between respective transmitters and receivers of the devices. Additionally, in the example shown in FIGS. 8-9, a particular orientation of the first and second devices may be needed to align a respective transmitter with a respective receiver.

This specification describes connector structures that provide alignment of CCUs and electrical connections for enabling transfer of power between devices. In some implementations, the connectors are configured to provide alignment in x, y, and z directions, relative to each other, and to provide removable retention among coupled connectors. The connectors are robust, easy to use, and can ensure contactless communications can be established and sustained between any two structures coupled together via the connectors. In addition, the connectors are compact structures that integrate power and alignment in a manner that minimizes the footprint required to incorporate the connector in a structure or device.

Figure 10A:
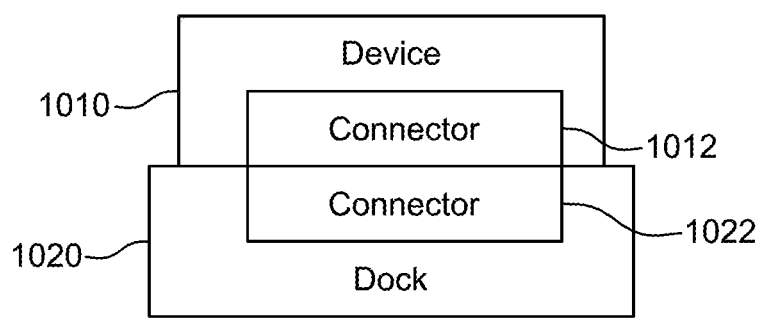
FIGS. 10A-10C show different illustrative connector embodiments, according to various embodiments.
Figure 10B:
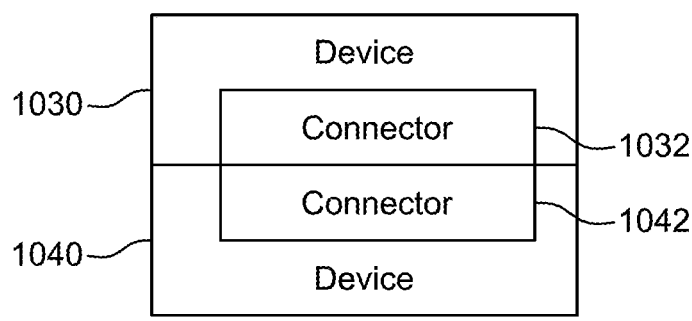
Figure 10C:
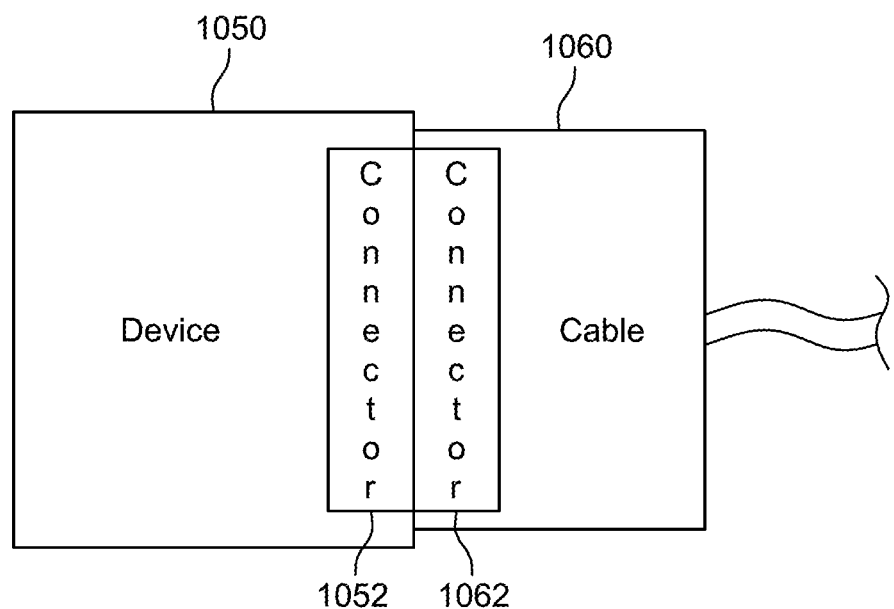

FIGS. 10A-10C show different illustrative connection embodiments. Each of FIGS. 10A-10C shows a device interfacing with another structure via a connector according to embodiments discussed herein. For example, FIG. 10A shows device 1010 connected to dock 1020 via connectors 1012 and 1022. FIG. 10B shows device 1030 connected to device 1040 via connectors 1032 and 1042. FIG. 10C shows device 1050 connected to cable 1060 via connectors 1052 and 1062.

Figure 11:
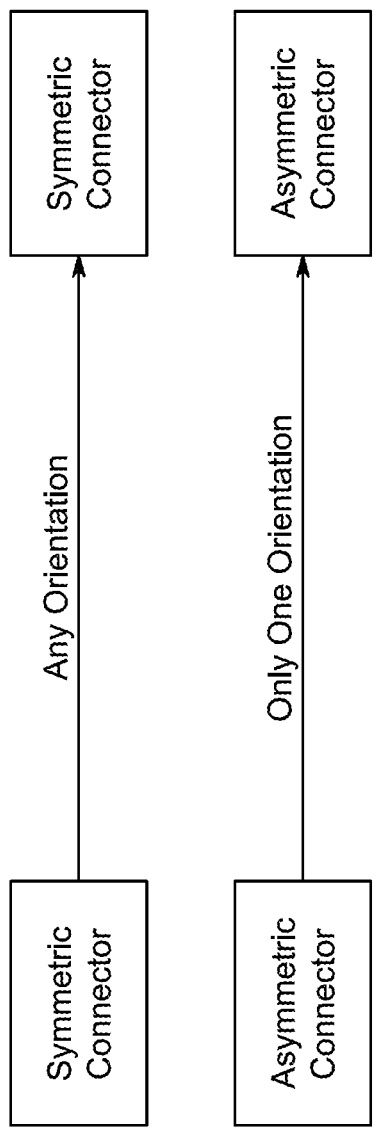
FIG. 11 shows that the connectors can be symmetric or asymmetric, according to various embodiments.

FIG. 11 shows that the connectors according to embodiments discussed herein can be symmetric or asymmetric. Symmetric connectors can offer the advantage that enables a user to connect his device to another structure without regard to a particular orientation. This can simplify the user experience, but may require additional design considerations to ensure CCUs are properly aligned regardless of the connection orientation. In addition, in symmetric connectors, circuitry, software, or a state machine may be used to determine how to use the CCUs. For example, if each connector has two CCUs, a determination is made as to which CCU serves as the transmitter and which serves as the receiver. Asymmetric connectors, in contrast, may require a particular orientation of the connectors in order to connect a device to another structure. The fixed orientation, however, may simplify alignment design constraints for the CCUs.

Figure 12A:
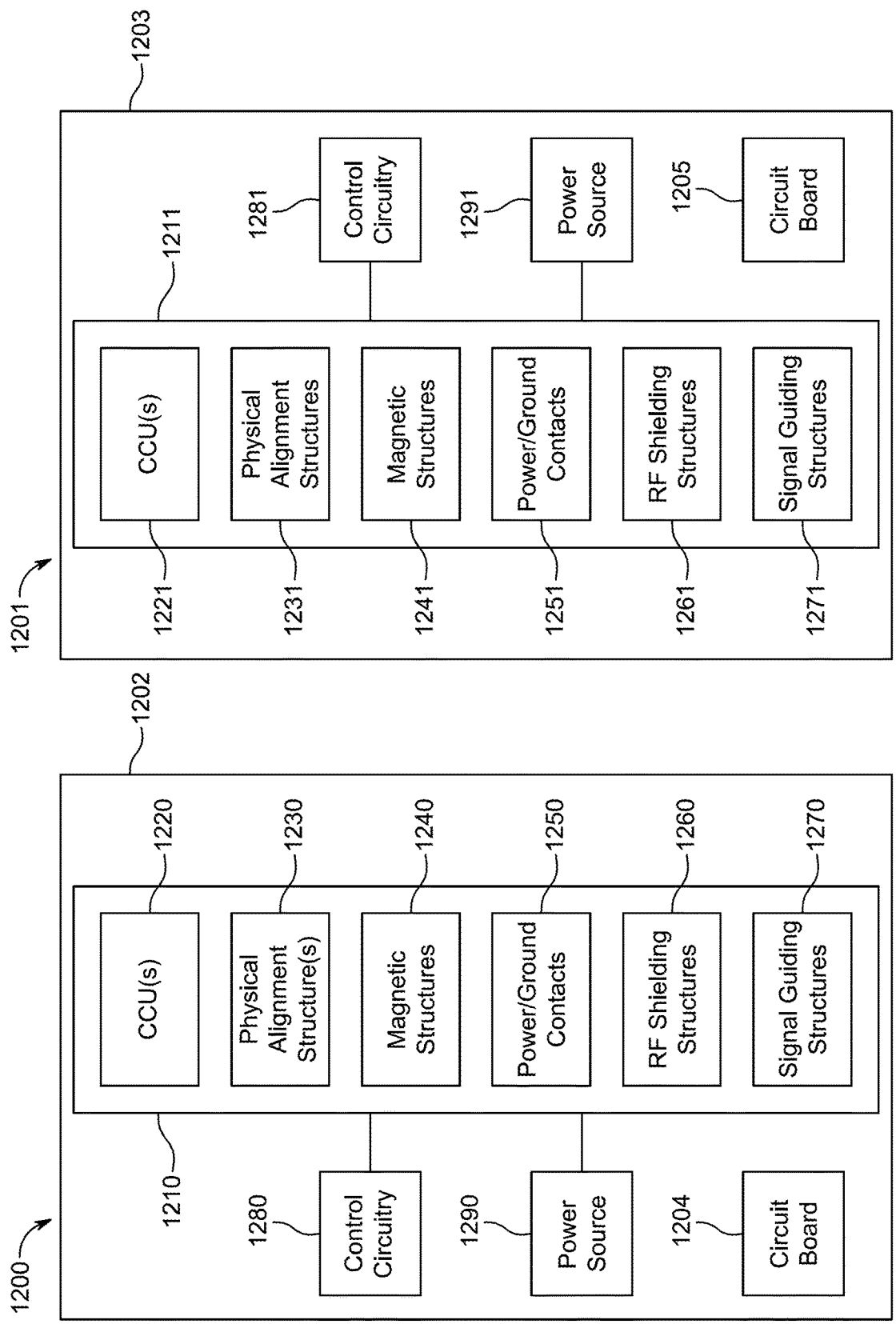
FIG. 12A shows an illustrative block diagram of structures that can be coupled together via a connector, according to an embodiment.
Figure 12B:
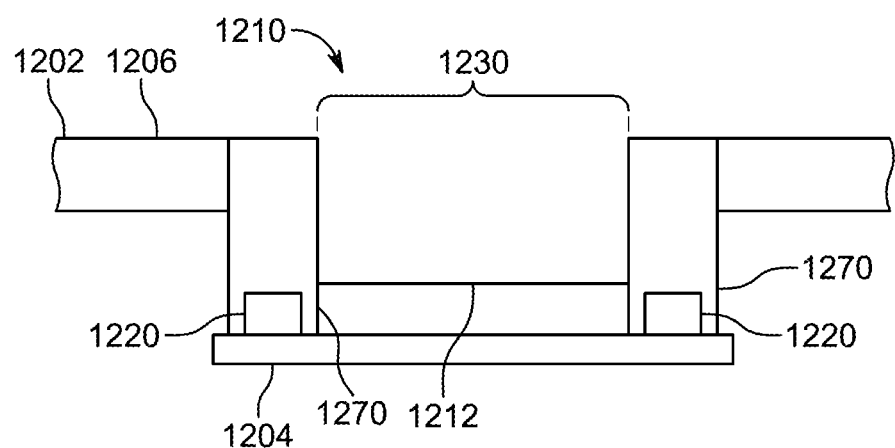
FIGS. 12B-12H show several illustrative cross-sectional diagrams of housing with integrated connectors, according to various embodiments.

FIG. 12A shows an illustrative block diagram of structure 1200 having connector 1210 that can be coupled to connector 1211 of structure 1201 according to an embodiment. Connector 1210 is designed to interface with a reciprocal connector 1211 of structure 1201. Connector 1210 can include one or more CCUs 1220, one or more physical alignment structures 1230, one or more magnetic structures 1240, power/ground contacts 1250, one or more RF shielding structures 1260, and one or more signal guiding structures 1270. Structure 1200 may also include control circuitry 1280 and power source 1290. Structures 1200 and 1201 may include other components but such components are omitted to avoid overcrowding the drawing. Structures 1200 and 1201 may be a device (e.g., a phone, tablet, computer), a dock, a cable, or other suitable structure including CCUs. Connector 1211 can include one or more CCUs 1221, one or more physical alignment structures 1231, one or more magnetic structures 1241, power/ground contacts 1251, one or more RF shielding structures 1261, and one or more signal guiding structures 1271. Structure 1201 may also include control circuitry 1281 and power source 1291.

Structure 1200 may have housing 1202 and circuit board (s) 1204 and structure 1201 may have housing 1203 and circuit board(s) 1205. Housings 1202 and 1204 may represent the outer shell of structures 1200 and 1201, respectively. For example, housings 1202 and 1204 can include any combination of a metal or plastic shell, glass, and a bezel. In some embodiments, portions of connector 1210 can form part of housing 1202, and portions of connector 1211 can form part of housing 1203. That is, certain portions of the connectors may be integrally formed within the housings, are part of the housings, or are secured to the housing. For example, one or more of physical alignment structures 1230, magnetic structures 1240, power/ground contacts 1250 may be integrated, part of, or secured to housing 1202.

Circuit boards 1204 and 1205 may serve as mounting platforms for portions of connectors 1210 and 1211. For example, circuit board 1204 can be positioned relative to a main body of connector 1210 and can contain CCUs 1220 and signal guiding structures 1270. CCUs 1220 can be mounted on the side of circuit board 1204 that is facing connector 1210, and a signal guiding structure 1270 can be positioned over each CCU so that it spans a distance between circuit board 1204 and connector 1210, thereby providing an EHF pathway between the CCU and housing 1202. A specific example of this configuration is shown in FIG. 19C.

CCUs 1220 have been discussed above. Connector 1210 may include any number of CCUs depending on which communications protocols (e.g., USB, DisplayPort, etc.) are supported by the connector. CCUs 1220 can communicate with counterpart CCUs 1221 in connector 1211. In one embodiment, connector 1210 may include two CCUs, similar to that shown in either device 210 or 220 of FIG. 2, where one CCU serves as a transmitter and the other CCU serves as a receiver. In another embodiment, connector 1210 may include only one CCU, which alternates roles between transmitter and receiver to conduct contactless data communications. In yet another embodiment, connector 1210 may include five CCUs to support, for example, DisplayPort.

Physical alignment structure 1230 represents one or more physical structures that are designed to mate with one or more reciprocal physical structures of device 1201, and in particular with reciprocal physical structures 1231 of connector 1211. Physical alignment structures 1230 and 1231 may be arranged such that when connectors 1210 and 1211 are interfaced together, CCUs 1220 and 1221 are optimally aligned with each other to efficiently conduct contactless communications. Power and ground contacts 1250 may be electrically and physically coupled to power and ground contacts 1251 when connectors 1210 and 1211 are interfaced together. In addition, magnetic structures 1240 and 1241 may also be aligned when connectors 1210 and 1211 are interfaced together. Further still, RF shielding structures 1260 and 1261 may also be aligned when connectors 1210 and 1211 are interfaced together.

The user experience in mating connectors 1210 and 1211 may be intuitive based on the design and configuration of physical alignment structures 1230 and 1231 and/or other components within the connector (e.g., magnetic structure 1240, power/ground contacts 1250, RF shielding structures 1260). For example, physical alignment structures 1230 and 1231 may have a keying structure that dictates how connectors 1210 and 1211 should mate. As another example, one of the connectors may be male and the other may be female.

Magnetic structures 1240 may be used to perform any one of several different tasks. For example, in one embodiment, magnet structures 1240 and 1241 may assist alignment structures 1230 in interfacing connectors 1210 and 1211. In another embodiment, magnetic structures 1240 and 1241 may provide a retention force to hold connectors 1210 and 1211 together. In yet another embodiment, magnetic structures 1240 and 1241 may also be used to convey signals from one device to another. For example, magnets may be used to indicate that an interface connection has been made between connectors 1210 and 1211.

Power and ground contacts 1250 and 1251 may be used to convey power via power and ground contacts. These contacts are based on physical interaction that enables electrical signals to pass. The physical contacts can take any suitable configuration, including, for example, interference fits, spring loaded contacts, pogo-pins, contact-to-contact patch connections, and the like. In addition to providing power, power and ground contacts 1250 and 1251 may be used to provide "connection made" signals to their respective control circuitries when connectors 1210 and 1211 are connected together.

RF shielding structure 1260 may represent structural configuration and material compositions that enable connector 1210 to exhibit an EHF shield when it is connected to connector 1211. The EHF shield is designed to minimize or completely eliminate EHF leakage that may emanate from CCUs during contactless data transfer. RF shielding structure 1260 and 1261 can be constructed from a combination of different materials and components to minimize or completely eliminate EHF leakage. These materials can include transmissive materials that are operable to facilitate propagation of EHF signals, reflective materials that are operable to reflect EHF signals, and absorptive materials are operable to absorb EHF signals. Examples of transmissive materials can include plastics and other materials that are electrically non-conductive (i.e., dielectric). Reflective materials can include, for example, metals, metal alloys, and other materials that are electrically conductive. Examples of absorptive materials can include, for example, carbon loaded (or magnetically loaded), rubber materials that are electrically non-conductive, but exhibit effective EHF dampening resonance due to their high permittivity and permeability. A specific example of an absorptive material is sold as Eccosorb, by Emerson & Cuming Microwave Products of Randolph, Mass.

In some embodiments, RF shielding structure 1260 can be constructed from just one of the different material types. For example, shielding structure 1260 can be constructed from just the conductive material or just the reflective material. In other embodiments, shielding structure 1260 can be constructed from two or more of the different material types. For example, shielding structure 1260 can be constructed from transmissive and reflective materials, from transmissive and absorptive materials, or from reflective and absorptive materials. As yet another example, shielding structure 1260 can be constructed from transmissive, reflective, and absorptive materials.

In some embodiments, shielding structure 1260 can be constructed from an open celled material. The open cell construction may be such that the any gaps that serve as a transmission path is a fraction of the wavelength of any EHF signal attempting to pass through. If desired, the open celled material may be constructed from an absorptive material to further enhance its EHF signal blocking capacity. In some embodiments, the open celled material may be air permeable but impenetrable to EHF signals. Thus, its usage in structures containing electronics requiring air-based cooling may be particularly advantageous. In some embodiments, the open celled material may be a foam that can be applied in various locations within an enclosure or connector as a liquid/gas mixture that can occupy "hard-to-reach" spaces, thereby enabling EHF signal containment.

For any coupled pair of connectors, the selection of material types for a first connector may be the same as for a second connector. Alternatively, the material selection for both connectors need not be identical in order to ensure an EHF leakproof shield exists between the two connectors. For example, for another coupled pair of connector, the selection of material types for a first connector assembly may be different than a selection of a material type for a second connector assembly. Thus, despite the use of different materials, a substantially shielded connection may exist between the two connectors. In some embodiments, the materials selected for both connector assemblies may be such that they complement each other when the two connector assemblies are mated together.

Signal guiding structures 1270 may be operative to guide EM signals through pathways from the CCU to the outside of the device and thereby minimize or eliminate crosstalk among adjacent paths within a device and across devices. The signal guiding structures can be constructed from a combination of different materials to shape the direction of signal propagation and to mitigate EHF leakage (which may cause cross-talk). These materials can include EHF transmissive materials that are operable to facilitate propagation of EHF signals, EHF reflective materials that are operable to reflect EHF signals, and EHF absorptive materials that are operable to absorb EHF signals. Examples of transmissive materials can include plastics and other materials that are electrically non-conductive (i.e., dielectric). Reflective materials can include, for example, metals, metal alloys, metal foam, and other materials that are electrically conductive. Absorptive materials may have a conductive component, or more exactly, have a loss mechanism that is modeled by a conductive or resistive component. They are often not very conductive for static fields, but can exhibit high dissipative loss at RF frequencies. For example some classes of magnetically loaded materials exhibit loss due to hysteresis losses in ferromagnetic materials. EHF dampening is not due to the permittivity and permeability, but due to other dissipative properties of the materials.

In some embodiments, the signal guiding structures can be constructed from just one of the different material types. For example, the signal guiding structures can be constructed from just the EHF transmissive material or just the EHF reflective material. In other embodiments, the structure can be constructed from two or more of the different material types. For example, one portion can be constructed from transmissive materials, and another portion can be constructed from reflective materials.

Signal guiding structures 1270 may be constructed to exhibit any suitable shape, and can be constructed from a single component or multiple components. Regardless of shape and construction configuration, each conduit may include at least one signal focusing structure that has a channel existing within the focusing structure. Any suitable shape, including for example, rectangular, elliptical, or polygonal shapes of any suitable dimension may characterize each channel. The focusing structure may be constructed from, lined with, or coated with an EHF reflective material that may simultaneously guide EHF signals along the channel and prevent those same signals from penetrating the channel wall.

In addition to providing one or more pathways for channeling EHF signals, the conduit structures may protect the EHF CCUs from shock events. That is, during an event that imparts shock energy to the device, such as a device drop, the conduit structure can absorb the shock to prevent potentially damaging energy transfer to the EHF CCUs. In one embodiment, the shock protection can be achieved by constructing at least a portion of the conduit structure from a relatively rigid material (e.g., plastic) that covers the EHF CCU(s). In another embodiment, shock protection can be achieved using a relatively compliant material (e.g., foam) that also covers the EHF CCU(s). In yet another embodiment, a combination of relatively rigid and compliant materials may be used to provide protection.

The signal guiding structures may also be constructed to account for tolerance variations in device stackup. That is, variations in component construction can vary the stackup tolerances when assembled. For example, the distance between the EHF units and the interface may vary depending on construction and variations in components. In one build, the distance may be x and in another build, the distance may be y, where x and y are different. The conduit structure may include a compliant material that is designed to accommodate variations in stackup. The compliant material may be compressible and thus able to ensure that the conduit structure makes a secure and flush connection with the interface.

Control circuitry 1280 and 1281 may perform various operations relating to connections between devices 1200 and 1210, including detection of the connection, verification of the connection, and termination of the connection. Control circuitry 1280 and 1281 may perform one or more checks to authorize communication between devices 1200 and 1201. Further, control circuitry 1280 may determine whether device 1201 is an acceptable device when connected to device 1200. Control circuitry 1280 may analyze the one or more signals received from second device 1201, such as from the CCU 1221. Control circuitry 1281 may analyze and/or process the electromagnetic signals received from device 1200 or more specifically from CCU 1220.

In some embodiments, the user may move a position of at least one of devices 1280 and 1281 relative to each other when the generated electrical EHF signal indicates that the connectors 1210 and 1211 are not in alignment (See FIG. 9). When connectors 1210 and 1211 are not in alignment, control circuitry 1280 may prevent CCUs 1220 from operating and supplying power from power source 1290 to device 1201 via power/ground contacts 1250. Further, devices 1280 and 1281 may be moved until the received electromagnetic EHF signal indicates that connectors 1210 and 1211 are in alignment (See FIG. 8). When connectors 1210 and 1211 are in alignment, control circuitry 1280 may enable CCUs 1220 to operate and enable supply of power from power source 1290 to device 1201 via power/ground contacts 1250. In addition, when connectors 1210 and 1211 are in alignment, the EHF shield formed among RF shielding structures 1260 and 1261 may be established to prevent undesired EHF signal leakage.

Figure 12C:
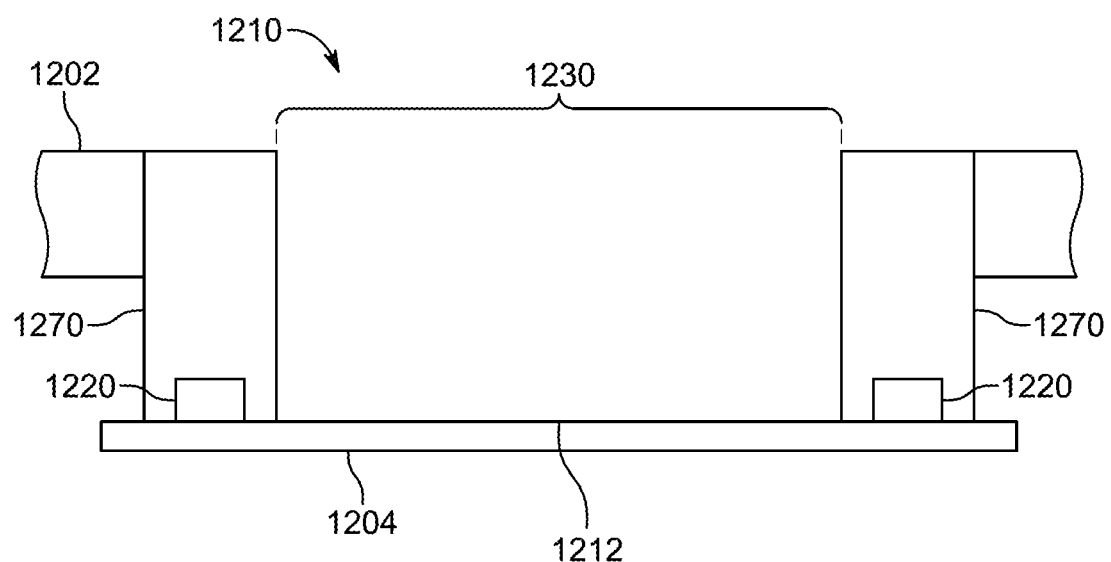
Figure 12D:
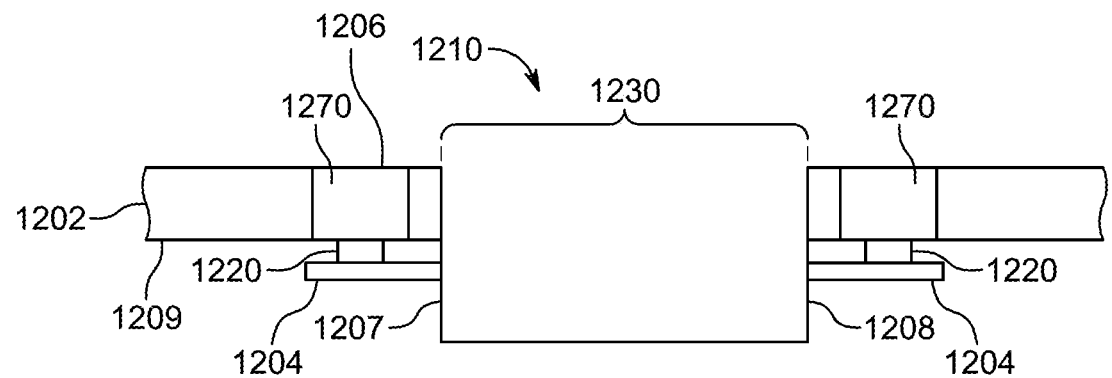
Figure 12E:
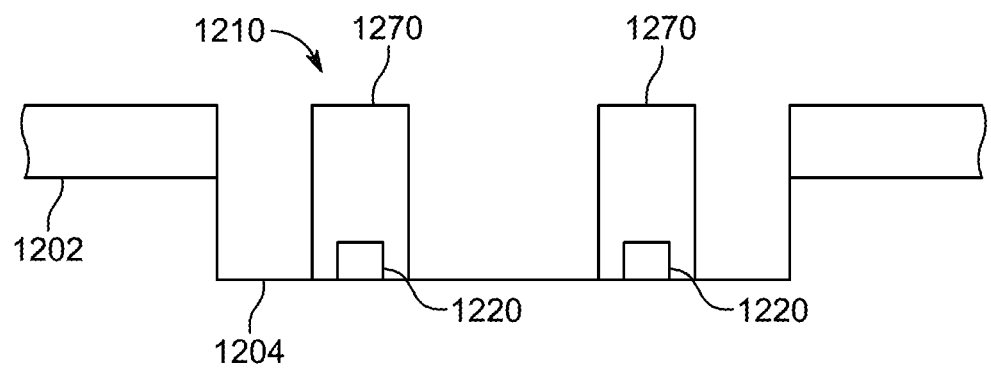
Figure 12F:
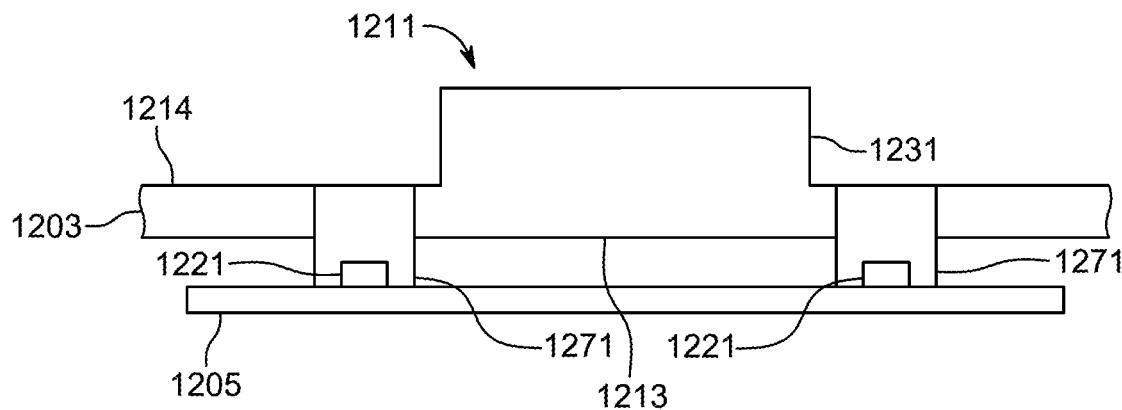
Figure 12G:
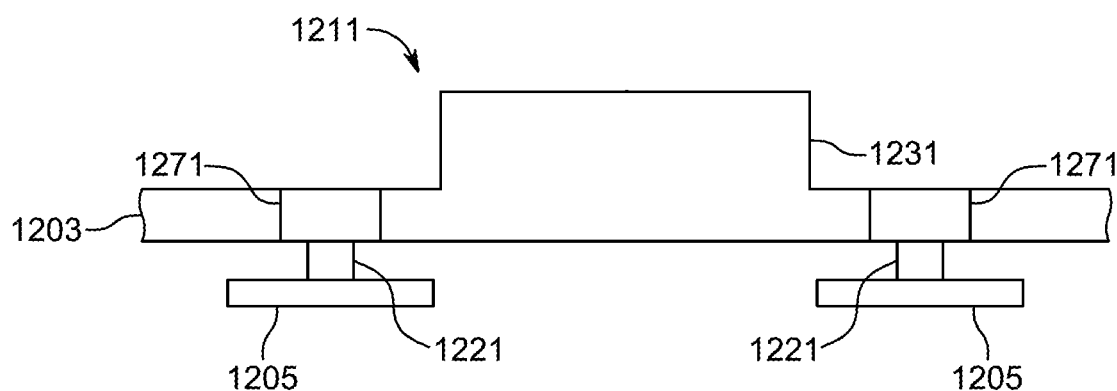
Figure 12H:
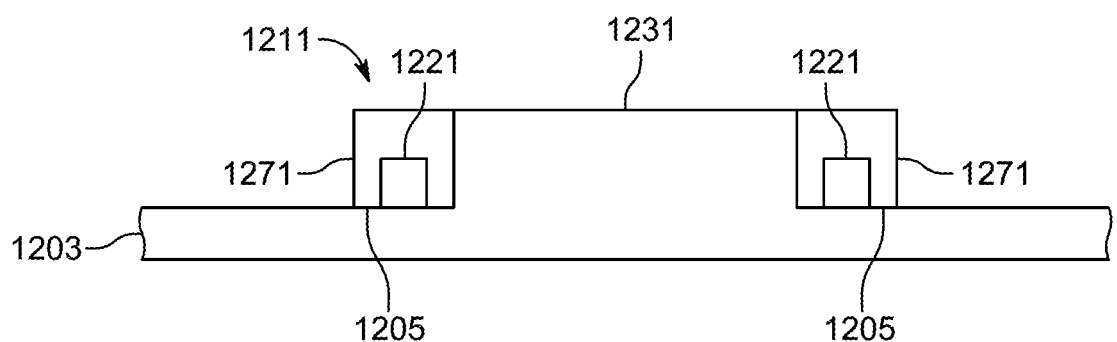

FIGS. 12B-12H shows several illustrative cross-sectional diagrams of housing with integrated connectors according to various embodiments discuss herein. FIGS. 12B-12E show illustrative female connectors and FIGS. 12F-12H show illustrative male connectors. Starting with FIG. 12B, this FIG. shows housing 1202, circuit board 1204, connector 1210, CCUs 1220, and signal guiding structures 1270 all arranged as shown. The magnetic structures and power/ground contacts may also be included in the connector, but are not shown to avoid overcrowding the drawing. Connector 1210 may be a female connector, represented by female alignment structure 1230, a cavity in this case, which is designed to receive a male alignment structure. In particular, circuit board 1204 is shown disposed below surface 1212 of connector 1210 by a fixed distance. In addition, circuit board 1204 is shown to span the width of connector 1210 and extend beyond the periphery of alignment structure 1230. Signal guiding structures 1270 can surround respective CCUs 1220 and span the distance between circuit board 1204 and surface 1206 of housing 1202. In some embodiments, signal guiding structures 1270 may constructed from two parts: a first part that is integrated into housing 1202 or connector 1210 and another part that interfaces with circuit board 1204 and the first part. FIG. 12C is similar to most aspects of FIG. 12B, except circuit board 1204 is coupled directly to surface 1212 of alignment structure 1230.

FIG. 12D is similar to most aspects of FIG. 12C, except circuit board 1204 is shown extending from sides 1207 and 1208 of alignment structure 1230, but does not span the distance across alignment structure 1230. CCUs 1220 can be mounted in circuit board 1204, but the spacing between circuit board 1204 and housing 1202 is such that a signal directing structure is not needed for providing an EHF pathway between CCU 1220 and surface 1209. However, a signal directing structure may be incorporated within connector 1210 or housing 1202 to provide an EHF pathway through housing 1202.

FIG. 12E shows that circuit board 1204 is contained within the confines of connector 1210, particularly within alignment structure 1230. Signal guiding structures 1270 can be positioned within the confines of alignment structure 1230, such multiple female cavities exist.

FIG. 12F shows housing 1203, circuit board 1205, connector 1211, CCUs 1221, alignment structure 1231, and signal guiding structures 1271 all arranged as shown. Connector 1211 may be male connector. In particular, circuit board 1205 is shown disposed below surface 1213 of connector 1211 by a fixed distance. Signal guiding structures 1271 can surround respective CCUs 1221 and span the distance between circuit board 1205 and surface 1214 of housing 1203. Alignment structure 1231 can represent a male alignment structure designed to be inserted into a female alignment structure of another connector. Magnetic structures and power/ground contacts are not shown to avoid overcrowding the drawing. In some embodiments, signal guiding structures 1271 may constructed from two parts: a first part that is integrated into housing 1203 or connector 1211 and another part that interfaces with circuit board 1205 and the first part. FIG. 12G is similar to most aspects of FIG. 12F, except circuit board 1205 is positioned close enough to housing 1203 that a signal directing structure is not required to be coupled between circuit board 1205 and housing 1203. Signal directing structure 1271 may exist within housing 1203, however.

FIG. 12H shows that circuit board 1205 is contained within the confines of connector 1211, and not outside as shown in FIGS. 12F-12G. Signal guiding structures 1271 can be positioned within the confines of alignment structure 1231.

It should be appreciated that the arrangements of housings 1202 and 1203, circuit boards 1204 and 1205, connectors 1210 and 1211, CCUs 1220 and 1221, alignment structures 1230 and 1231, magnetic structures 1240 and 1241, power/ground contacts 1250 and 1251, and signal guiding structures 1270 and 1271 are merely illustrative and that many other configurations and arrangements not shown or discussed are possible. The arrangements can be generically characterized as a connector having CCUs contained within a housing of the connector, a connector having CCUs abutting the housing of the connector, or a connector having CCUs contained outside of a housing of the connector.

Figure 13:
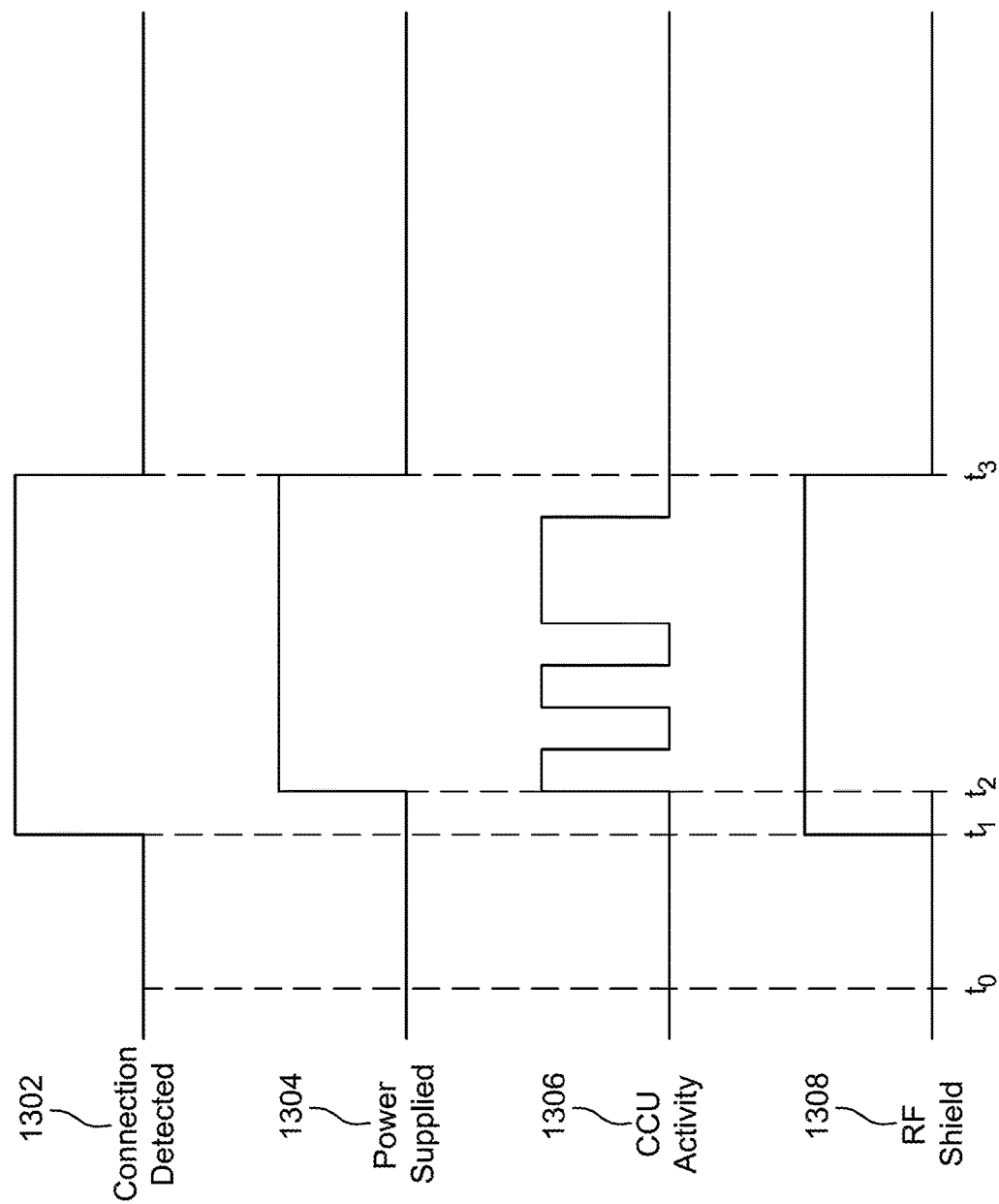
FIG. 13 shows an illustrative timing diagram of two connectors being connected together, according to an embodiment.

FIG. 13 shows an illustrative timing diagram of two connectors being connected together according to an embodiment. For example, the timing diagram may represent different signal and connection events that occur when connectors 1210 and 1211 are connected and disconnected. As shown, waveforms are shown for connection detected 1302, power supplied 1304, CCU activity 1306, and RF shield 1308. At time, t0, both connectors are not attached, and as a result, each of the waveforms are LOW. At time, t1, both connectors are coupled together, which causes connector detected 1302 to transition from LOW to HIGH, and the RF shield may be present (as indicated by the HIGH instance of RF shield 1308). At time, t2, power may be supplied from one connector to the other (as indicated by power supplied waveform transitioning to HIGH), the CCU can begin contactlessly transmitting data (as indicated by the HIGH instances of CCU activity 1306). At time, t3, the connectors are disconnected, resulting in all four waveforms to transition to LOW.

Figure 14:
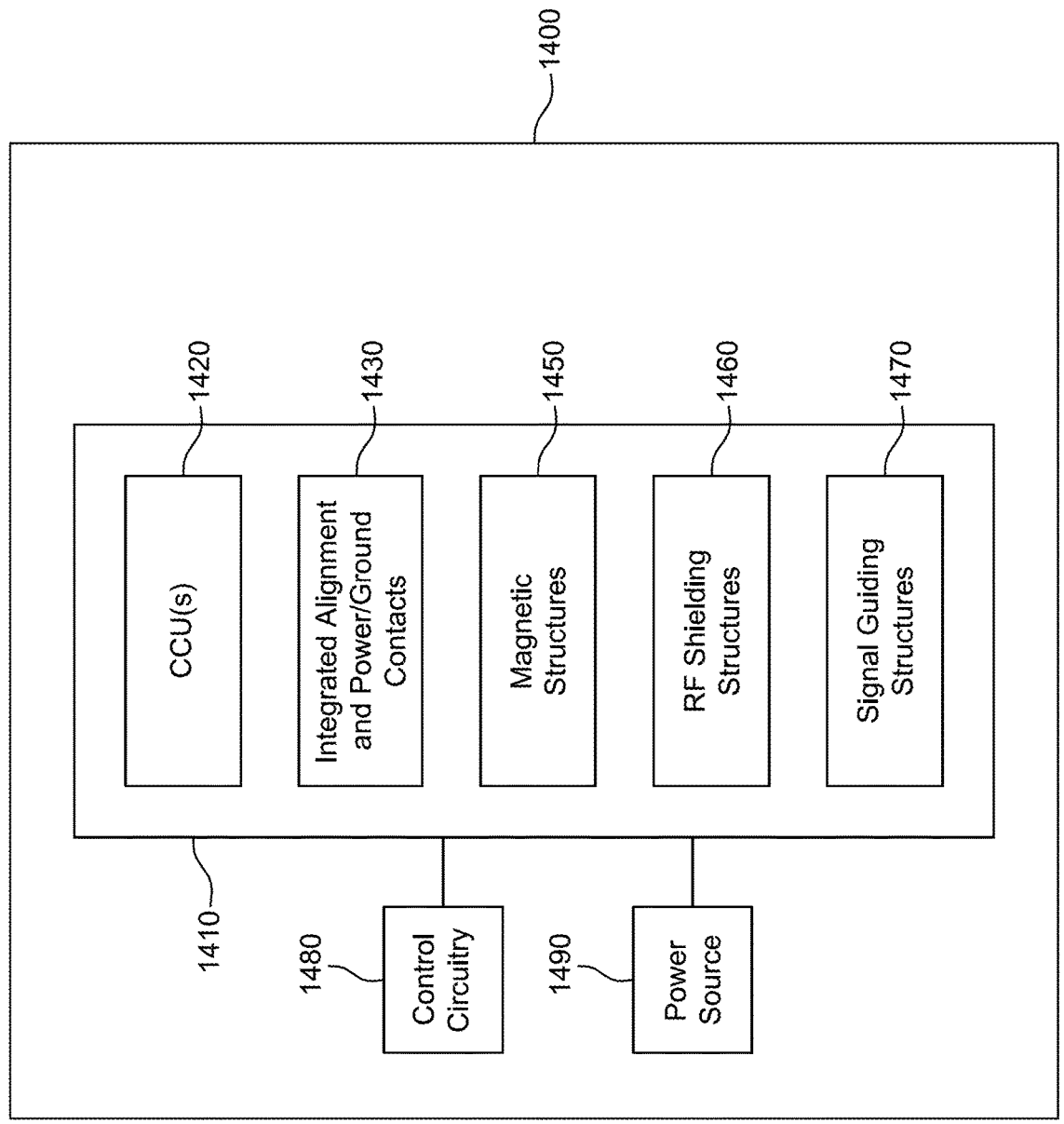
FIG. 14 shows an illustrative block diagram of structure having a connector that can be coupled to another connector of another structure, according to an embodiment.

FIG. 14 shows an illustrative block diagram of structure 1400 having connector 1410 that can be coupled to another connector of another structure according to an embodiment. Structure 1400 may include many of the same components as structure 1200, and similarly named components need not be re-discussed. Connector 1410 can include one or more CCUs 1420, integrated alignment and power/ground contacts assembly 1430, one or more magnetic structures 1450, one or more RF shielding structures 1460, and one or more signal guiding structures 1470. Structure 1400 may also include control circuitry 1480 and power source 1490.

Integrated alignment and power/ground contacts assembly 1430 may represent an integration of both alignment structures and power and ground contacts within a single assembly. This assembly may simultaneously provide symmetric or asymmetric alignment guidance for the connector as well as electrical contacts for enabling power transfer. When assembly 1430 is interfaced with a counterpart assembly, the CCUs are aligned so that they can efficiently conduct contactless communications. More detailed embodiments of assembly 1430 are discussed below in connection with the text accompanying FIGS. 17-23.

Figure 15:
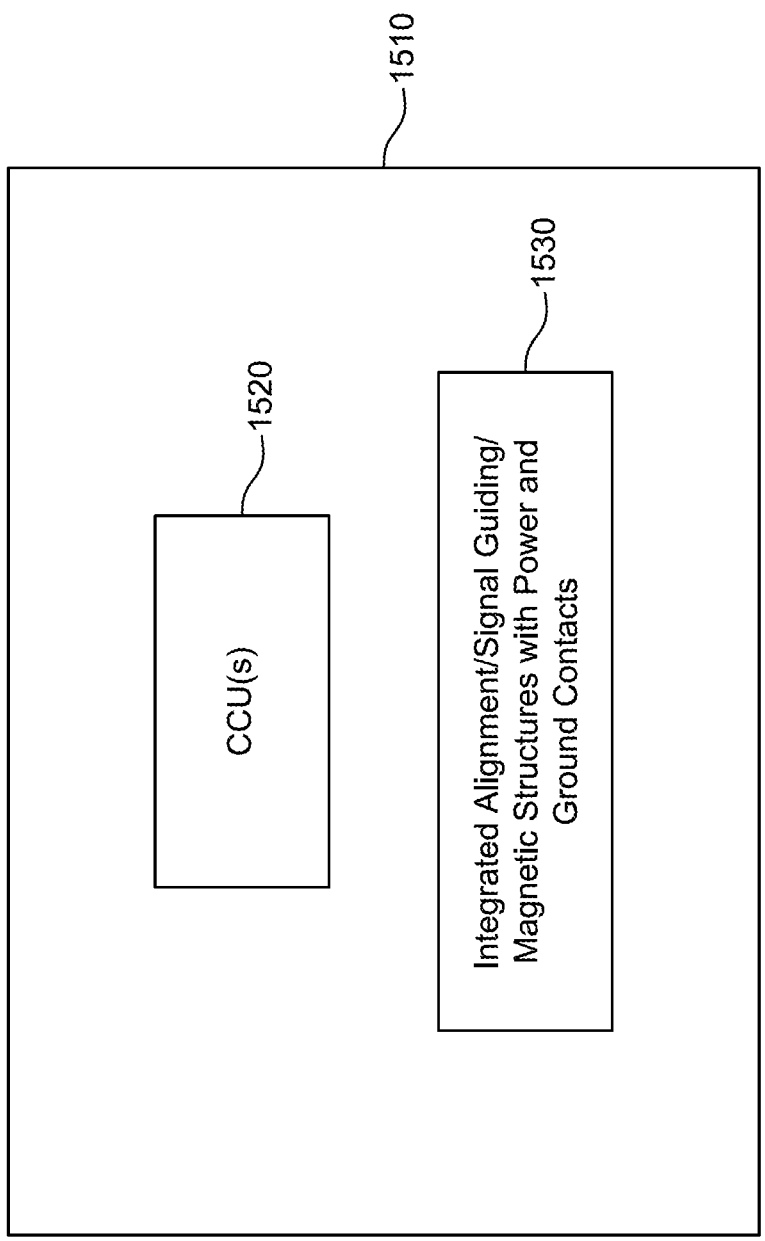
FIG. 15 shows an illustrative block diagram of a connector that can be coupled to another connector of another structure, according to an embodiment.

FIG. 15 shows an illustrative block diagram of connector 1510 that can be coupled to another connector of another structure according to an embodiment. Connector 1510 can include one or more CCUs 1520 and integrated alignment/signal guiding/magnetic structures with power and ground contacts assembly 1530. Integrated alignment/signal guiding/magnetic structures with power and ground contacts assembly 1530 may represent an integration of each of alignment structures, signal guiding structures, magnetic structures, and power and ground contacts within an assembly. When assembly 1530 is interfaced with a counterpart assembly, the CCUs are aligned so that they can efficiently conduct contactless communications. More detailed embodiments of assembly 1530 are discussed below in connection with the text accompanying FIGS. 17-23.

It should be understood that integrated assembly 1530 may include any combination of a subset of the alignment structures, signal guiding structures, magnetic structures, and power and ground contacts, and optionally can also include RF shielding structures. For example, in one embodiment, assembly 1530 may include alignment structures, signal guiding structures, and power and ground contacts. In another embodiment, assembly 1530 may include signal guiding structures, magnetic structures, and power and ground contacts. In yet another embodiment, assembly 1530 may include alignment structures, magnetic structures, and power and ground contacts.

Figure 16:
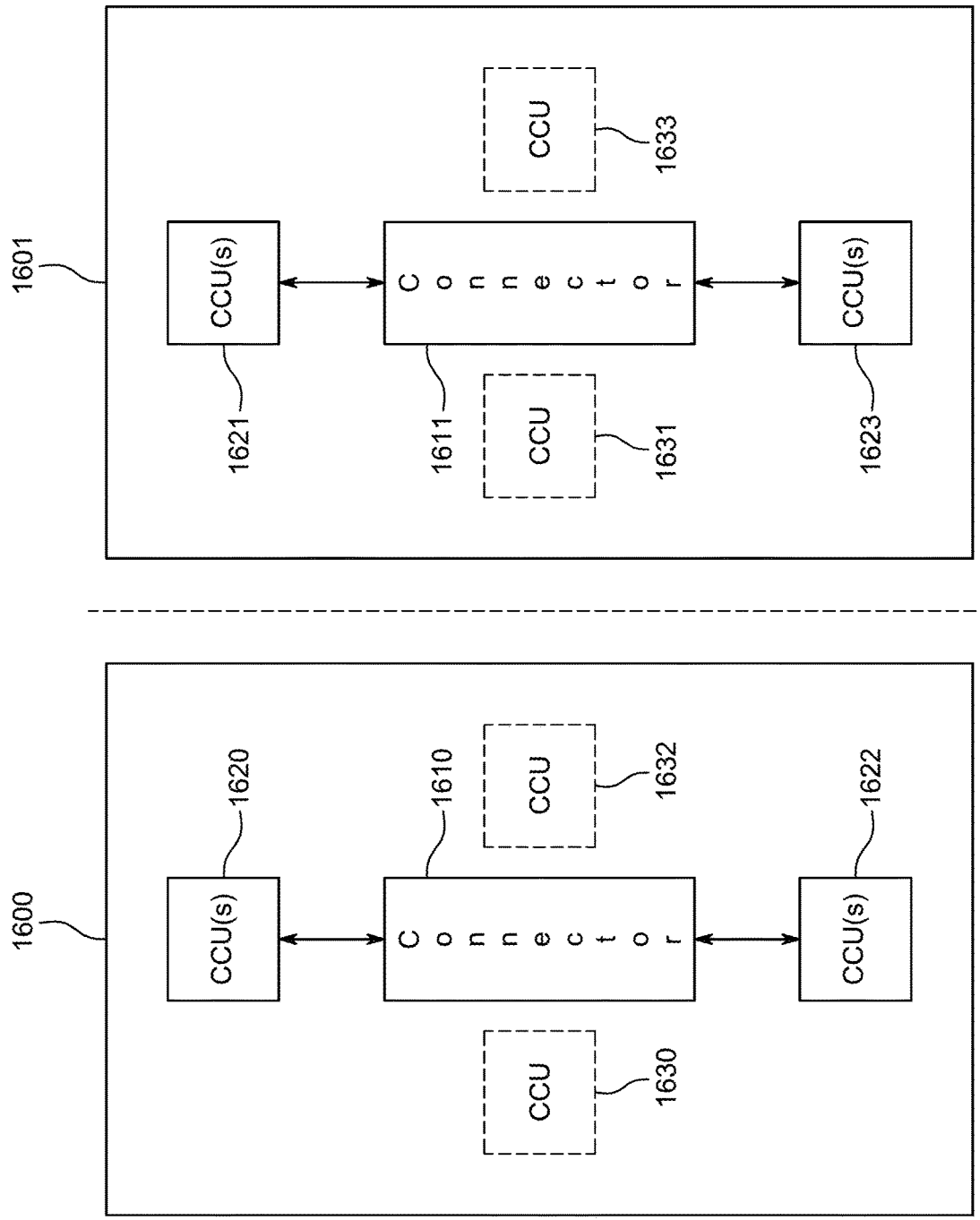
FIG. 16 shows an illustrative block diagram of two structures each having a mechanical connector and CCUs strategically positioned relative to the connector, according to an embodiment.

FIG. 16 shows an illustrative block diagram of two structures each having a mechanical connector and CCUs strategically positioned relative to the connector according to an embodiment. As shown, structures 1600 and 1601 each include respective mechanical connectors 1610 and 1611, and CCUs 1620, 1621, 1622, and 1623. Mechanical connectors 1610 and 1611 can include one or more of the alignment structures, magnetic structures, power and ground contacts, and RF shielding structures, as discussed above. CCUs 1620 and 1622 may each be positioned at a fixed location relative to connector 1610, and CCUs 1621 and 1623 may each be positioned at the same corresponding fixed locations relative to connector 1611 (e.g., CCU 1620 corresponding to CCU 1621, and CCU 1622 corresponding to CCU 1623). Maintaining a consistent positioning of the CCUs relative to their respective connectors can ensure that counterpart CCUs are optimally aligned when two connectors are mated together. That is, the connectors provide a consistent and fixed mating interface that ensures counterpart CCUs are aligned and connector specific features (e.g., power, connection detection, retention, shielding, etc.) are enabled.

In some embodiments, such as that shown in FIG. 16, CCUs 1620 and 1622 may be positioned in a symmetrical fashion such that connector 1610 can be oriented in any position (e.g., two possible positions shown in FIG. 16) when it is coupled to connector 1611. For example, in a first orientation, CCU 1620 may communicate with CCU 1621 and CCU 1622 can communicate with CCU 1623. In the second orientation, CCU 1620 may communicate with CCU 1623 and CCU 1622 can communicate with CCU 1621.

In another embodiment, CCUs 1620-1623 may be repositioned to the locations of CCUs 1630-1633, respectively, or CCUs 1630-1633 may be provided in addition to CCUs 1620-1623. The positioning of CCUs 1630-1633 may be positioned in a symmetrical fashion such that connector 1610 can be oriented in any one of two of its possible positions when connected to connector 1611. In yet another embodiment, connectors 1610 and 1611 may be designed to permit connection in any one of four different orientations (e.g., by constructing the connectors to have a square shape). In such an embodiment, all of CCUs 1620-1623 and 1630-1633 may be positioned to provide the symmetry needed to accommodate all four orientations.

Figure 17:
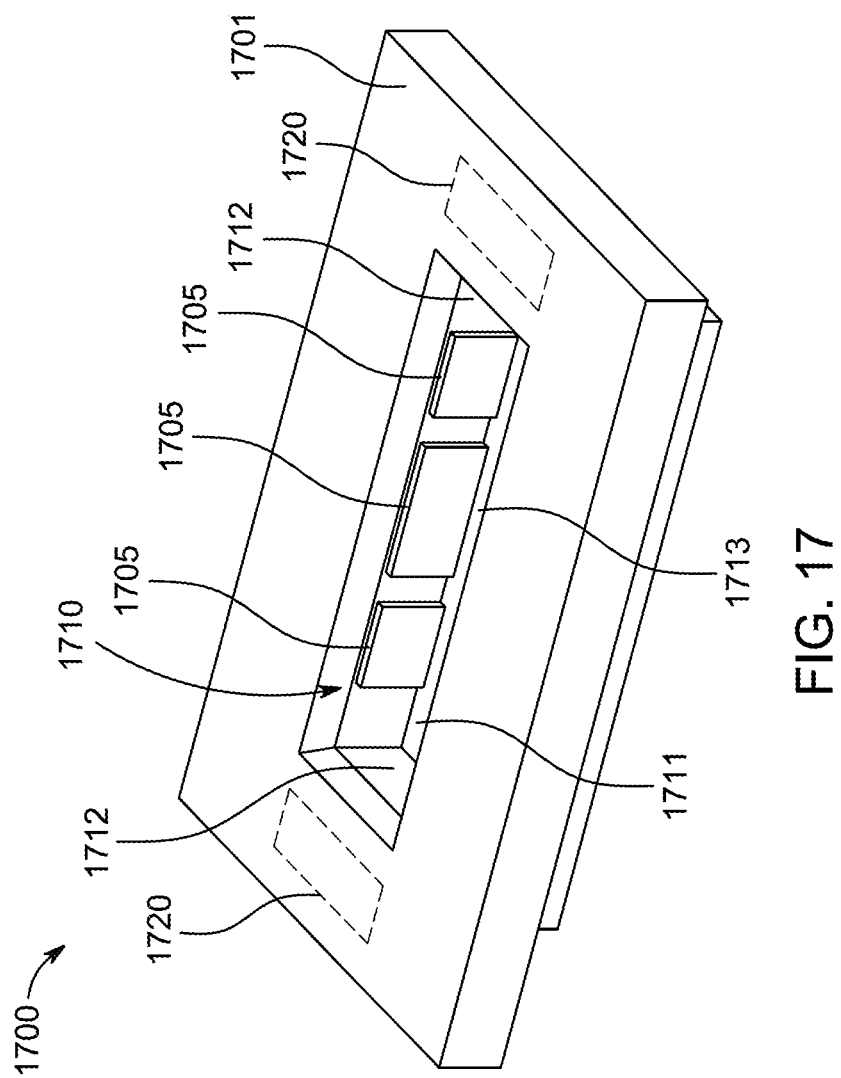
FIG. 17 shows an illustrative recessed pocket connector, according to an embodiment.

FIG. 17 shows an illustrative recessed pocket connector 1700 according to an embodiment. Connector 1700 can include integrated alignment and power and ground contact assembly 1710 and CCUs 1720 (delineated by dashed lines). Assembly 1710 can include recessed region 1711 defined by four side walls 1712 and bottom wall 1713. The depth of recessed region 1711 may be set to enable sufficient electrical and mechanical interface with a counterpart connector (not shown) that can be inserted into connector 1700. Recessed region 1711 can take any suitable shape such as, for example, the rectangular shape as shown. One or more of the sidewalls may be chamfered near surface 1701 to facilitate insertion of the counterpart connector. Contacts 1705 may exist adjacent to one or more of sidewalls 1712 and/or bottom wall 1713. In some embodiments, contacts 1705 may protrude into recessed region 1711 through one or more of side walls 1712. For example, connector 1700 may be an injection molded part that surrounds contacts 1705 so that they form a substantially watertight structure that prevents ingress of water and moisture inside of connector 1700. The contacts can be symmetrically positioned within recessed region 1711 to enable multiple orientation assembly of connector 1700 to its counterpart connector.

FIGS. 18A-18C show different illustrative top view of connectors with different contact positions, according to various embodiments. FIG. 18A shows connector 1810 with contacts 1820-1822 arranged adjacent to first wall 1811 and contacts 1830-1832 arranged adjacent to second wall 1812, as shown. Contacts 1820-1822 may be positioned directly across respective contacts 1830-1832 to provide a symmetrical arrangement. In one embodiment, contacts 1820, 1822, 1830 and 1832 may serve as ground contacts and contacts 1821 and 1831 may serve as power contacts. In another embodiment, contacts 1820, 1822, 1830 and 1832 may serve as power contacts and contacts 1821 and 1831 may serve as a ground contacts. CCUs 1818 may be positioned as shown or elsewhere on connector 1810.

FIG. 18B shows connector 1840 with contacts 1851-1854 arranged adjacent to walls first wall 1841-1844, respectively, as shown. Contacts 1851 and 1853 may be positioned directly across from each other, and contacts 1852 and 1854 may be positioned directly across from each other to provide a symmetrical arrangement. In one embodiment, contacts 1851 and 1853 may serve as ground contacts and contacts 1852 and 1854 may serve as power contacts, or vice versa. CCUs 1848 may be positioned as shown on top or below connector 1840 as shown.

FIG. 18C shows connector 1860 with contacts 1871-1873 arranged as shown. Contacts 1871 may be positioned adjacent to wall 1861 and contact 1873 may be positioned adjacent to wall 1863. Contact 1872 may be positioned on bottom surface 1862. Walls 1861 and 1863 may be opposite of each other to provide a symmetrical arrangement. In one embodiment, contacts 1871 and 1873 may serve as ground contacts and contact 1872 may serve as a power contact, or vice versa. CCUs 1878 may be positioned as shown on top or below connector 1870 as shown.

Figure 19A:
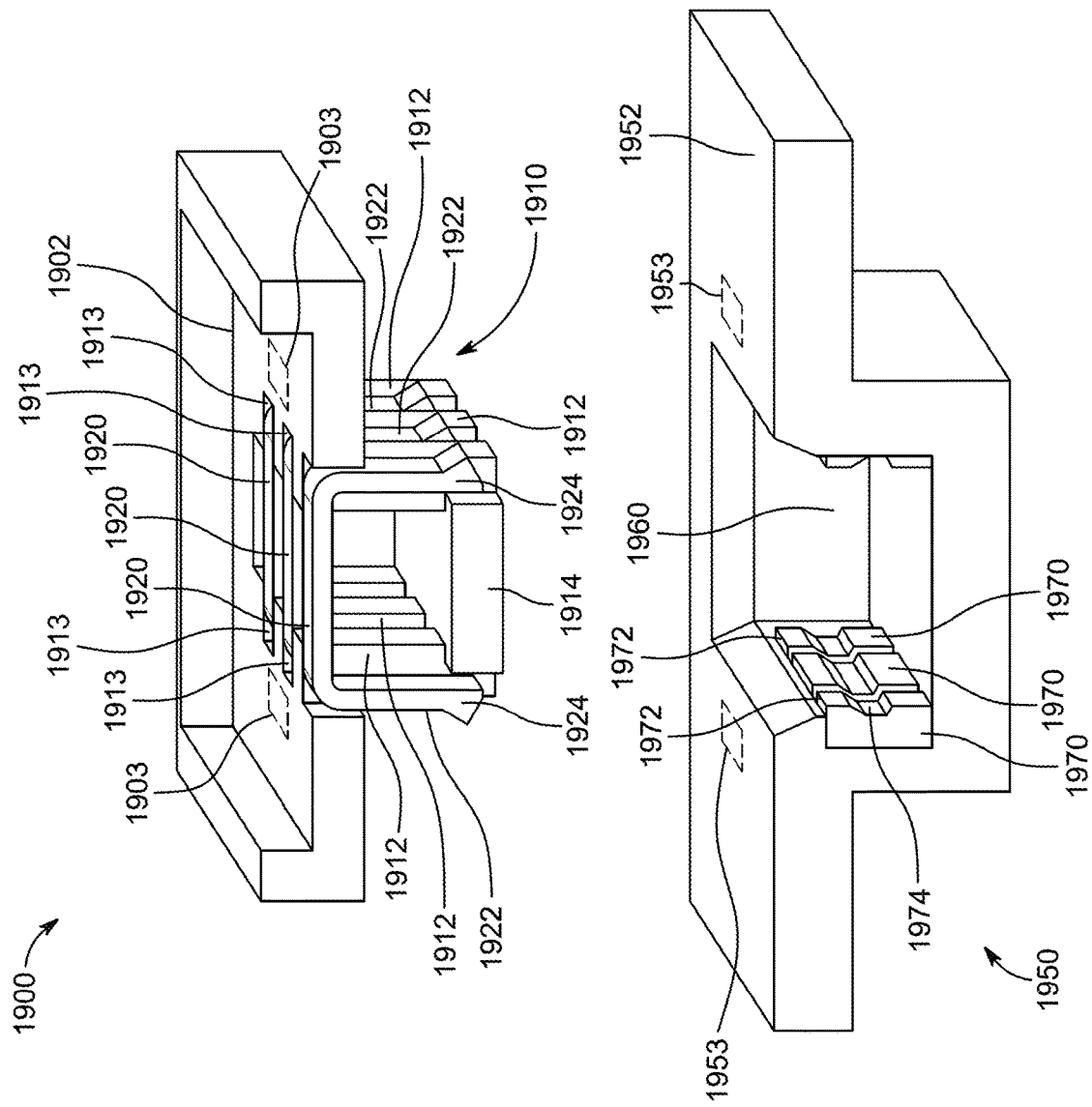
FIGS. 19A-19C show mechanical connectors, according to an embodiment.
Figure 19B:
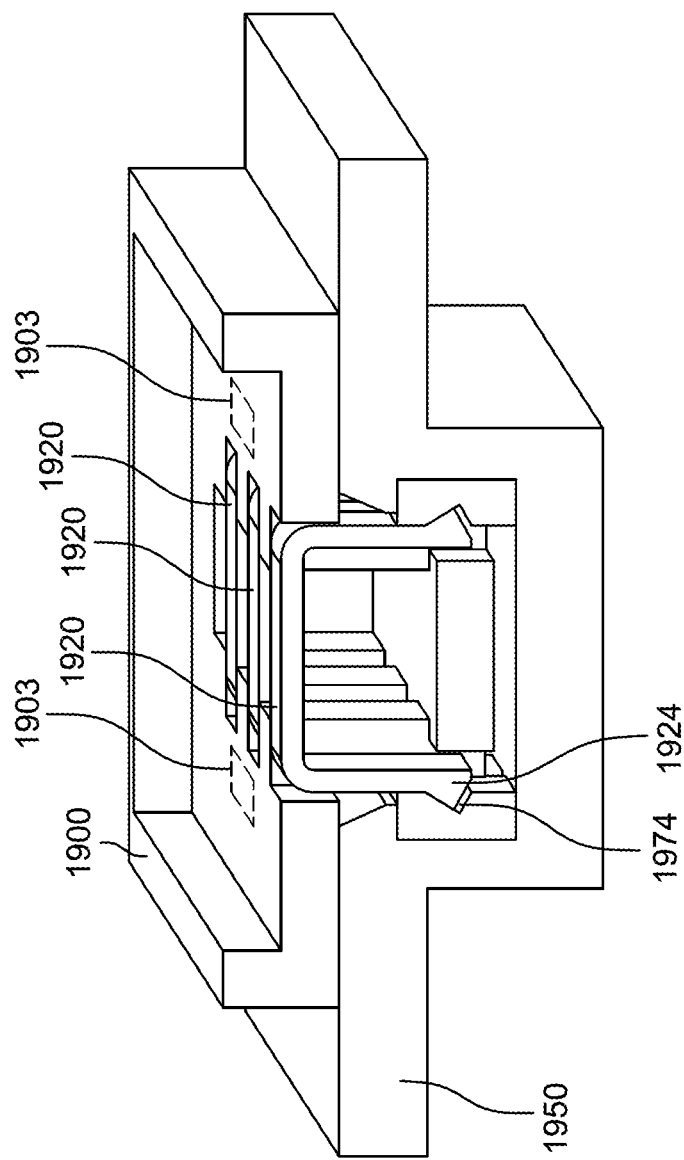
Figure 19C:
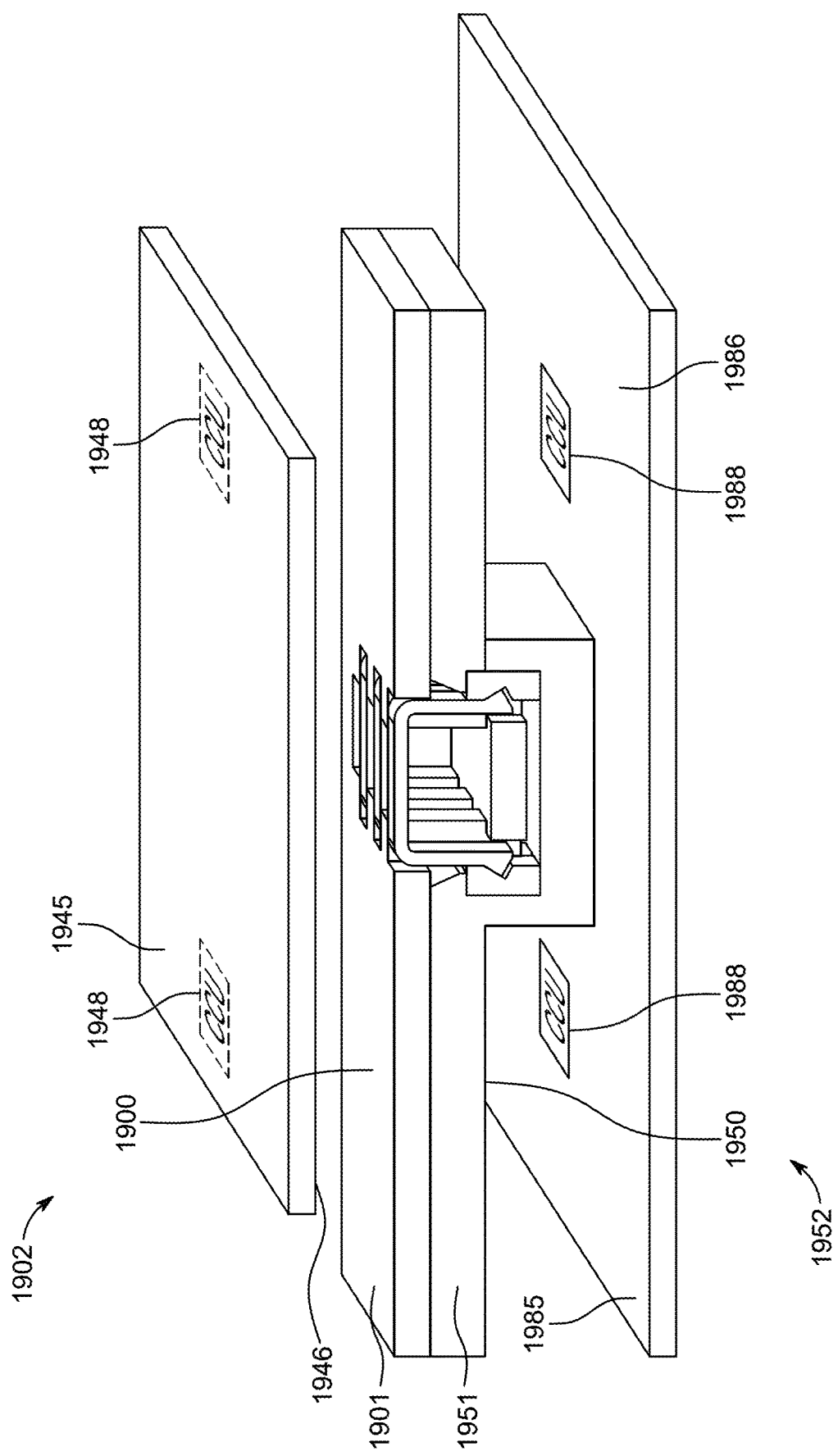

FIGS. 19A and 19B show mechanical connectors 1900 and 1950 according to an embodiment. FIG. 19A shows connectors 1900 and 1950 in a disconnected state, and FIG. 19B shows connectors 1900 and 1950 in a connected state. Connector 1900 may be a male connector that can be inserted into and removed from connector 1950, which may be a female connector. Both connectors 1900 and 1950 include physical alignment structures and power/ground contacts. Other features such as signal guiding structures, magnetic structures, and RF shielding structures may be included within one or both connectors 1900 and 1950, but are not shown to avoid overcomplicating the drawing. Connectors 1900 and 1950 can be coupled together to ensure that their respective CCUs are optimally aligned and held in place until a user separates the connectors.

Connector 1900 can include substrate 1902, protrusion member 1910, and contacts 1920. Substrate 1902 may generally refer to a housing of connector 1900, a planar surface of that housing, or a circuitry board positioned on the housing of connector 1900. Protrusion member 1910 extends in a direction perpendicular to a planar surface of housing 1902 a fixed distance. Protrusion member 1910 can include leg members 1912 that span the fixed distance from substrate 1902 to distal member 1914. Distal member 1914 may be a base plate that is integrally connected to and provides structural stability for leg members 1912. Leg members 1912 may be arranged such that gaps 1913 exist between adjacent leg members 1912. Contacts 1920 can be secured within gaps 1913. Each contact 1920 may include spring tensioned members 1922 that are designed to exert a force perpendicular to the insertion direction of the connector 1900 with respect to connector 1950. For example, when connector 1900 is inserted into connector 1950, spring tensioned members 1922 are operative to engage reciprocal contacts in connector 1950 when connector 1900 is fully inserted therein. In some embodiments, each spring tensioned member 1922 may have retention engagement member 1924 that is designed to interface with a respective retention receiving portion of connector 1950. Retention engagement member 1924 may hold connector 1900 in place within connector 1950 until a user disconnects the connectors. CCUs 1903 may be positioned on housing 1902, as shown.

Connector 1950 can include substrate 1952, cavity 1960, and contacts 1970. Substrate 1952 may generally refer to a housing of connector 1900, a planar surface of that housing, or a circuitry board positioned on the housing of connector 1900. Cavity 1960 may be dimensioned to accommodate protrusion member 1910 and resembles a well or pocket extending below a surface of substrate 1952. Contacts 1970 may be insert molded within cavity 1960 and are separated by gaps 1972. Each contact 1970 can include retention receiving portion 1974 that is designed to interface with one of retention engagement members 1924. CCUs 1953 may be positioned on top of housing 1952, as shown, or below housing 1952.

Substrates 1902 and 1952 may represent housings of their respective connectors 1900 and 1950. In addition, substrates 1902 and 1952 may abut either of the major faces of connectors 1900 and 1950 and serve as mounting points for CCUs. The CCUs can be precisely positioned on their respective substrates such that when connectors 1900 and 1950 are coupled together, the CCUs on both substrates 1902 and 1952 are optimally aligned for enabling contactless communication. When connectors 1900 and 1950 are coupled together, contacts 1920 interface with contacts 1970. The arrangement of contacts 1920 and 1970 can be symmetrical so that connector 1900 can be inserted in any of two different orientations within connector 1950. When contacts 1920 and 1970 are connected, retention engagement members 1924 are nestled into retention receiving portions 1974, which may be implemented as undercuts. In addition, when connectors 1900 and 1950 are connected, base plate 1914 may or may not contact the bottom surface of cavity 1960.

FIG. 19C shows how connectors 1900 and 1950 can be integrated within or coupled to a housing of their respective devices, according to an embodiment. As shown, connector 1900 can be included as part of device housing 1901 of device 1902, and connector 1950 can be included as part of device housing 1951 of device 1952. Thus, when device housings 1901 and 1951 are coupled together, their respective connectors 1900 and 1950 provide the alignment and connection of power and ground contacts, as well as CCUs. Substrate 1945 is shown positioned above housing 1901 and is contained within device 1902 and substrate 1985 is shown positioned below housing 1951 and is contained within device 1952. Substrate 1945 may be mounted to a structure (not shown) within device 1902 or to device housing 1901 so that is positioned a fixed distance away from connector 1900. In one embodiment, CCUs 1948 may be mounted to surface 1946 of substrate 1945. Surface 1946 may face connector 1900. In addition, conduit structures (not shown) may be placed between substrate 1945 and connector 1900 around each CCU 1948 to provide EHF channels in which contactless signals pass between connector 1900 and CCU 1948. In another embodiment, CCUs 1948 may be mounted directly to connector 1900.

Substrate 1985 is shown to be below connector 1950 and may be mounted to a structure (not shown) within device 1952 or to device housing 1951 so that it is positioned a fixed distance away from connector 1950. In one embodiment, CCUs 1988 may be mounted to surface 1986 of substrate 1985. Surface 1986 may face connector 1950. In addition, conduit structures (not shown) may be placed between substrate 1985 and connector 1950 around each CCU 1988 to provide EHF channels in which contactless signals pass between connector 1950 and CCU 1988. In another embodiment, CCUs 1988 may be mounted directly to connector 1950 (e.g., on the surface of connector 1950 facing substrate 1985).

Figure 20:
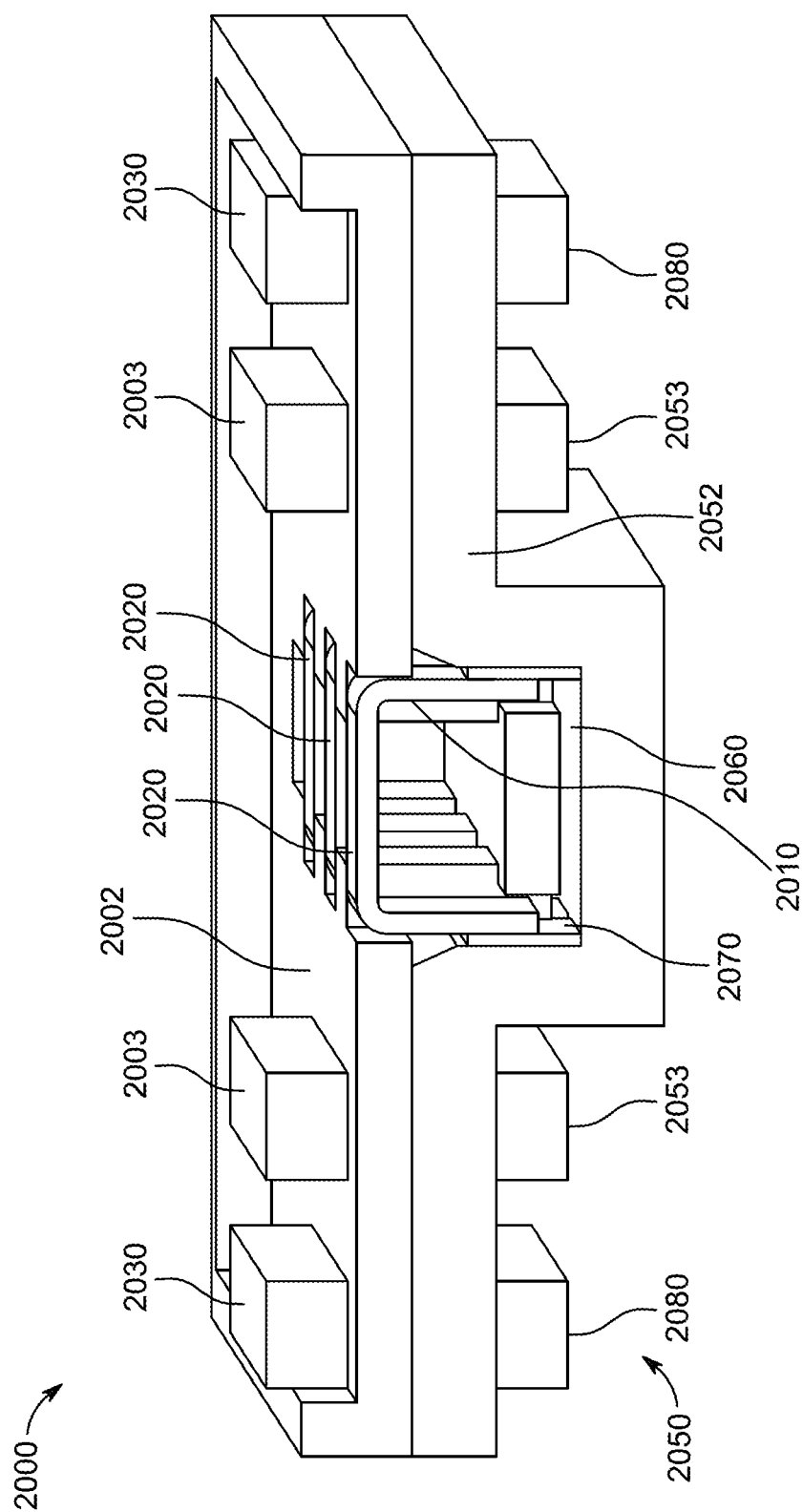
FIG. 20 shows mechanical connectors coupled together, according to an embodiment.

FIG. 20 shows mechanical connectors 2000 and 2050 coupled together according to an embodiment. Connectors 2000 and 2050 are similar to connectors 1900 and 1950, but have a few modifications. For example, magnets 2030 and 2080 may be used to provide retention force to keep connectors 2000 and 2050 together. The use of magnets 2030 and 2080 may eliminate need for contacts 2020 and 2070 to retain each other when the two connectors are coupled together. This is evidenced by the elimination of retention engagement members and retention receiving portions. Contacts 2020 may be spring biased to ensure electrical contact is made with reciprocal contacts 2070.

Any number of CCUs can be placed on connectors 2000 and 2050. For example, in connector 2000, the CCUs can be placed on a top surface or bottom surface of substrate 2002, within substrate 2002, or within protrusion member 2010. Similarly, in connector 2050, the CCUs can be placed on a top surface or bottom surface of substrate 2052, within substrate 2052, or within cavity 2060. In some embodiments, the position of the magnets and CCUs can be switched. The CCUs can be positioned anywhere on their respective connectors 2000 and 2050. For example, the CCUs can be positioned adjacent to magnets 2030 and 2080. As another example, the CCUs can be positioned in lieu of magnets 2030 and 2080 as shown. In this example, the magnets would be repositioned to accommodate the position of the CCUs. As shown in FIG. 20, CCUs 2003 are mounted on substrate 2002 and CCUs 2053 are mounted to substrate 2052.

Figure 21:
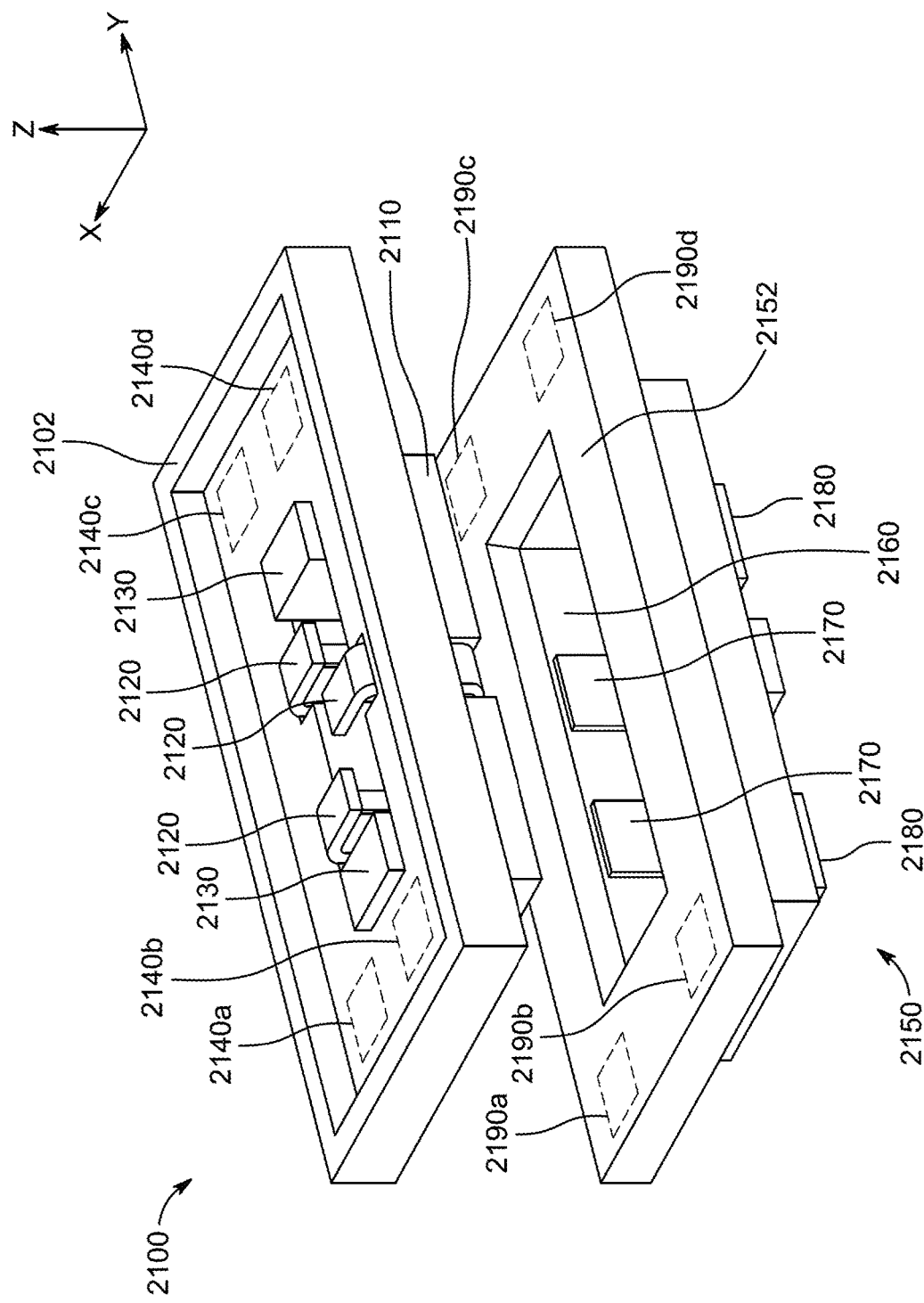
FIG. 21 shows mechanical connectors coupled together, according to an embodiment.

FIG. 21 shows mechanical connectors 2100 and 2150 coupled together according to an embodiment. Connector 2100 may serve as a male member and connector 2150 may serve as a female member. Connectors 2100 and 2150 are arranged in an asymmetric configuration, but it should be understood that the contacts can be arranged to accommodate a symmetric configuration. Connector 2100 can include substrate 2102, protrusion member 2110, contacts 2120, and magnets 2130. Connector 2150 can include substrate 2152, cavity 2160, contacts 2170, and magnets 2180. Substrates 2102 and 2152 may represent housings of their respective connectors 2100 and 2150. In addition, substrates 2102 and 2152 may abut either of the major faces of connectors 2100 and 2150 serve as mounting points for CCUs (not shown). Cavity 2160 may be dimensioned to accommodate protrusion member 2110 and resembles a well or pocket extending below a surface of substrate 2152. Contacts 2170 may be insert molded within cavity 2160. Any number of CCUs can be placed on connectors 2100 and 2150. For example, in connector 2100, the CCUs can be placed on a top surface or bottom surface of substrate 2102, within substrate 2102, or within protrusion member 2110. Similarly, in connector 2150, the CCUs can be placed on a top surface or bottom surface of substrate 2152, within substrate 2152, or within cavity 2160. In some embodiments, the position of the magnets and CCUs can be switched. For example, magnets 2130 can be switched with CCUs and the magnets may be positioned elsewhere within connector 2100.

Protrusion member 2110 extends in a direction perpendicular to substrate 2102 a fixed distance and is dimensioned to fit within cavity 2160. Contacts 2120 may be integrated within protrusion member 2110. A portion of contacts 2120 may be exposed so that they can form an electrical connection with contacts 2170 when connectors 2100 and 2150 are connected together. The contacts may be considered sliding contacts, cleaning contacts, or wiping contacts. The contact force between contacts 2130 and 2170 can be perpendicular to the insertion direction. For example, if the insertion direction is along the z-axis (as shown), the contact force can be along the x-axis (as shown) or the y-axis (not shown).

In the embodiment shown, magnets 2130 can be integrated within protrusion member 2110 and are operative to maintain a retention force with magnets 2180 when connectors 2100 and 2150 are connected together. Magnets 2130 can be positioned "outside" of contacts 2120 such that contacts are aligned between magnets 2130 along the y-axis. In another embodiment, magnets 2130 can be interspersed in between contacts 2120. For example, in an interspersed arrangement, magnets and contacts may alternate along the y-axis. In another embodiment, magnet 2130 can be centrally positioned with respect to the contacts such that the contacts are "outside" of the magnet when aligned along the y-axis. For example, one or more magnets may be positioned in between the contacts. In yet another embodiment, magnets 2130 may be positioned external to protrusion member 2110 such that one or more magnets are placed in one or more locations around the periphery of protrusion member 2110. For example, a one piece magnet may circumnavigate a region around protrusion member 2110. As another example, one magnet can be positioned in the positive X direction adjacent to member 2110 and another magnet can be positioned in the negative X direction adjacent to member 2110. It should be understood that the arrangement of contacts 2170 and magnets 2180 mimic the arrangement of contacts 2120 and magnets 2130, and that a repetitive discussion of arrangements for connector 2150 need not be discussed.

Both of connectors 2100 and 2150 show illustrative CCU locations 2140a-d and 2190a-d, which are delineated by dashed lines. As shown, CCU locations 2140a-d and 2190a-d are located in the quadrants of their respective substrates 2102 and 2152. It should be understood that the CCU locations are merely illustrative, and the CCUs may be placed in other locations on or within their respective substrates. It should also be appreciated that any number of CCUs may be placed on or within the substrate. For example, in one embodiment, there may only be one CCU placed on substrate 2102 and only one CCU placed on substrate 2152. In another example, two CCUs may be placed on each substrate, with one CCU placed on side of the connector and the other CCU placed on the other side of the connector. When connectors 2100 and 2150 are coupled together, in particular, the coupling of protrusion member 2110 and cavity 2160 ensures CCU locations 2140a-d are aligned with CCU locations 2190a-d, respectively.

It should be understood that the CCUs associated with connectors 2100 and 2150 may be placed on one or more circuit boards that are mounted a fixed distance away from a housing and/or the connector, similar to the embodiment shown in FIG. 19C. Thus, the teachings of FIGS. 12B-12D, 12F, 12G, and 19 can be applied to connectors 2100 and 2150.

Figure 22A:
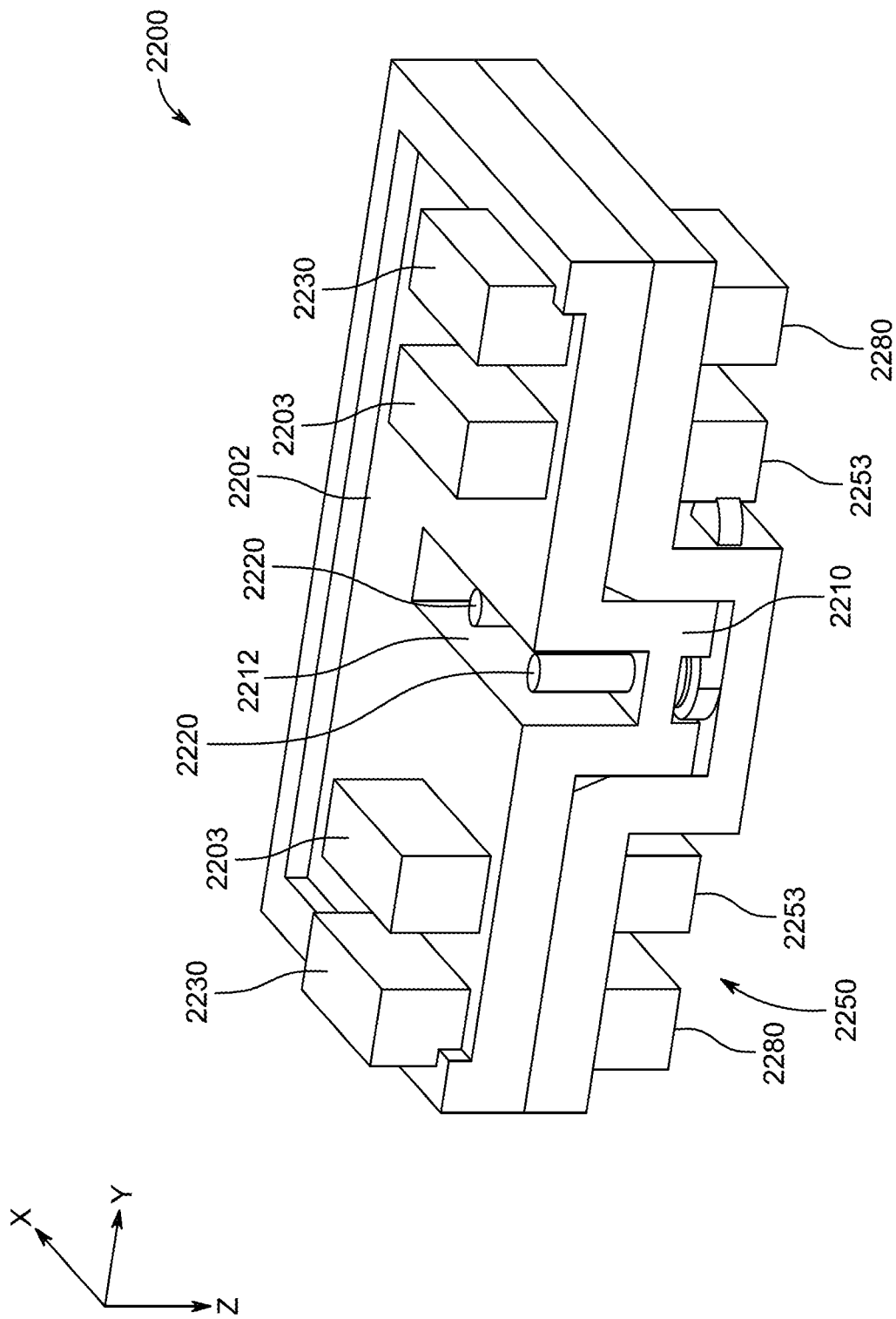
FIG. 22A shows an illustrative cross-sectional view of two connectors coupled together, according to an embodiment.
Figure 22B:
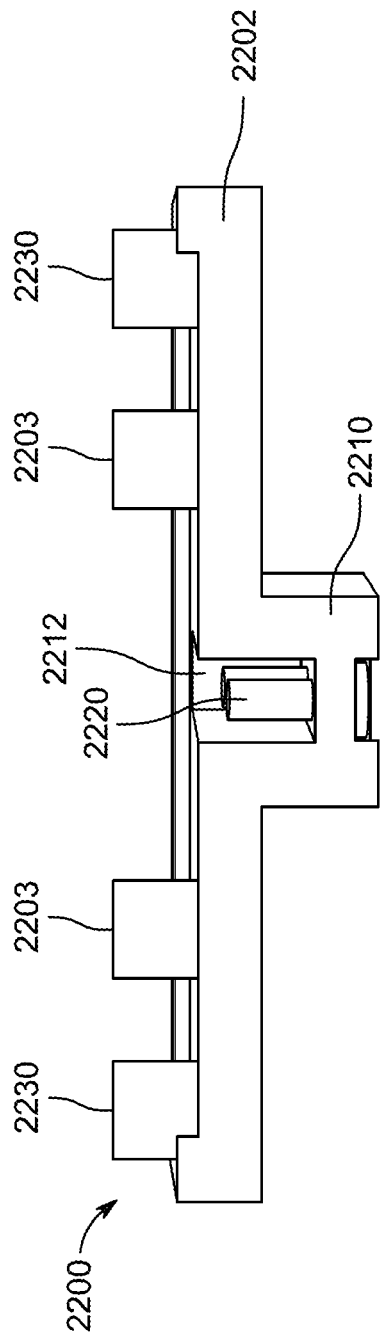
FIG. 22B shows an illustrative cross-sectional view of one of the connectors of FIG. 22A, according to an embodiment.
Figure 22C:
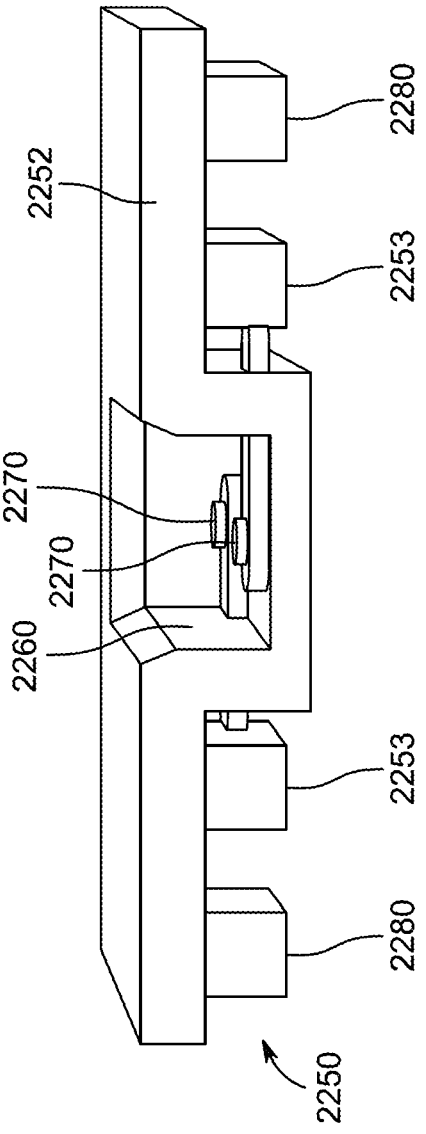
FIG. 22C shows an illustrative cross-sectional view of the other connector, according to an embodiment.

FIG. 22A shows an illustrative cross-sectional view of connectors 2200 and 2250 coupled together. FIG. 22B shows an illustrative cross-sectional view of connector 2200 and FIG. 22C shows an illustrative cross-sectional view of connector 2250. FIGS. 22A-22C will be collectively referred to herein. Connectors 2200 and 2250 use in-line contacts that employ axial contact force to establish an electrical connection, where the axial contact force is in the same direction as the insertion direction. In conjunction with the electrical and mechanical connection, the CCUs on both connectors are aligned with respect to each other. Connectors 2200 and 2250 can be retained together with magnets or a physical retention feature.

Connector 2200 can include substrate 2202, protrusion member 2210, contacts 2220, magnets 2230, and one or more CCUs 2203. Connector 2250 can include substrate 2252, cavity 2260, contacts 2270, magnets 2280, and one more CCUs (2253). Substrates 2202 and 2252 may represent housings of their respective connectors 2200 and 2250. In addition, substrates 2202 and 2252 may abut either of the major faces of connectors 2200 and 2250 and serve as mounting points for the CCUs. Any number of CCUs can be placed on connectors 2200 and 2250. For example, in connector 2200, the CCUs can be placed on a top surface or bottom surface of substrate 2202, within substrate 2202, or within protrusion member 2210. Similarly, in connector 2250, the CCUs can be placed on a top surface or bottom surface of substrate 2252, within substrate 2252, or within cavity 2260. In some embodiments, the position of the magnets and CCUs can be switched. For example, magnets 2230 can be switched with CCUs and the magnets may be positioned elsewhere within connector 2200.

Cavity 2260 may be designed to provide asymmetric or symmetric registration for protrusion member 2210. Protrusion member 2210 can include channel 2212 in which contacts 2220 are secured therein. Channel 2212 is shown to have a single row of contacts extending along the x-axis, but this is merely illustrative. If desired, channel 2212 can be aligned along the y-axis. As another example, a N×M row of contacts may exist within channel 2212, where N and M are integers greater than 1. The arrangement of the contacts and/or registration features may dictate whether the connectors are symmetric or not. Contacts 2270 mimic the arrangement of contacts 2230.

It should be understood that the CCUs associated with connectors 2200 and 2250 may be placed on one or more circuit boards that are mounted a fixed distance away from a housing and/or the connector, similar to the embodiment shown in FIG. 19C. Thus, the teachings of FIGS. 12B-12D, 12F, 12G, and 19 can be applied to connectors 2200 and 2250.

In some embodiments, such as that shown in FIGS. 22A-22C, contacts 2220 can be pogo pin contacts that each provides spring loaded force to securely engage one of contacts 2270. In this embodiment, contacts 2270 may be, for example, a nail type or flat plate type of connector designed to interface with a tip portion of a pogo pin contact. In another embodiment, contacts 2220 and 2270 can be the nail type or flat plate type of connector. In yet another embodiment, contacts 2220 can be the nail type or flat plate type of connector and contacts 2270 can be pogo pin contacts.

Figure 23A:
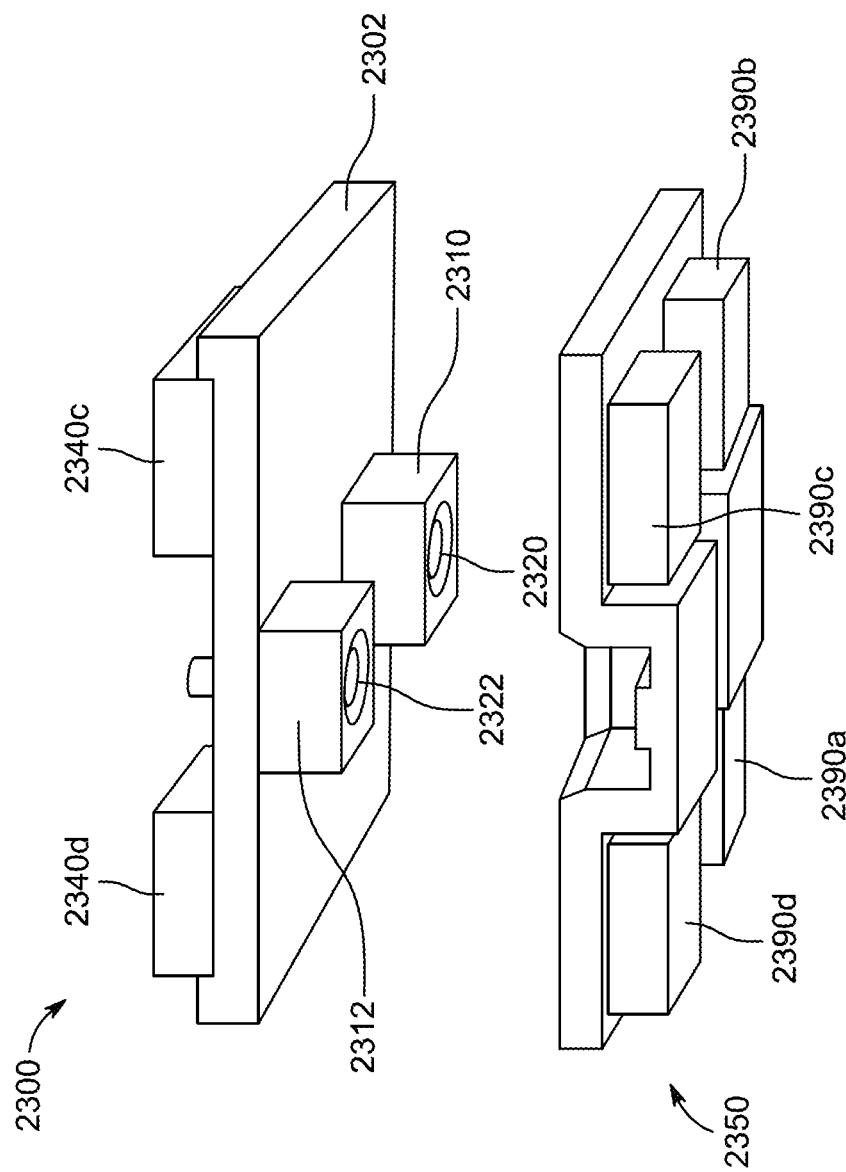
FIGS. 23A-23B show different illustrative views of two connectors, according to an embodiment.
Figure 23B:
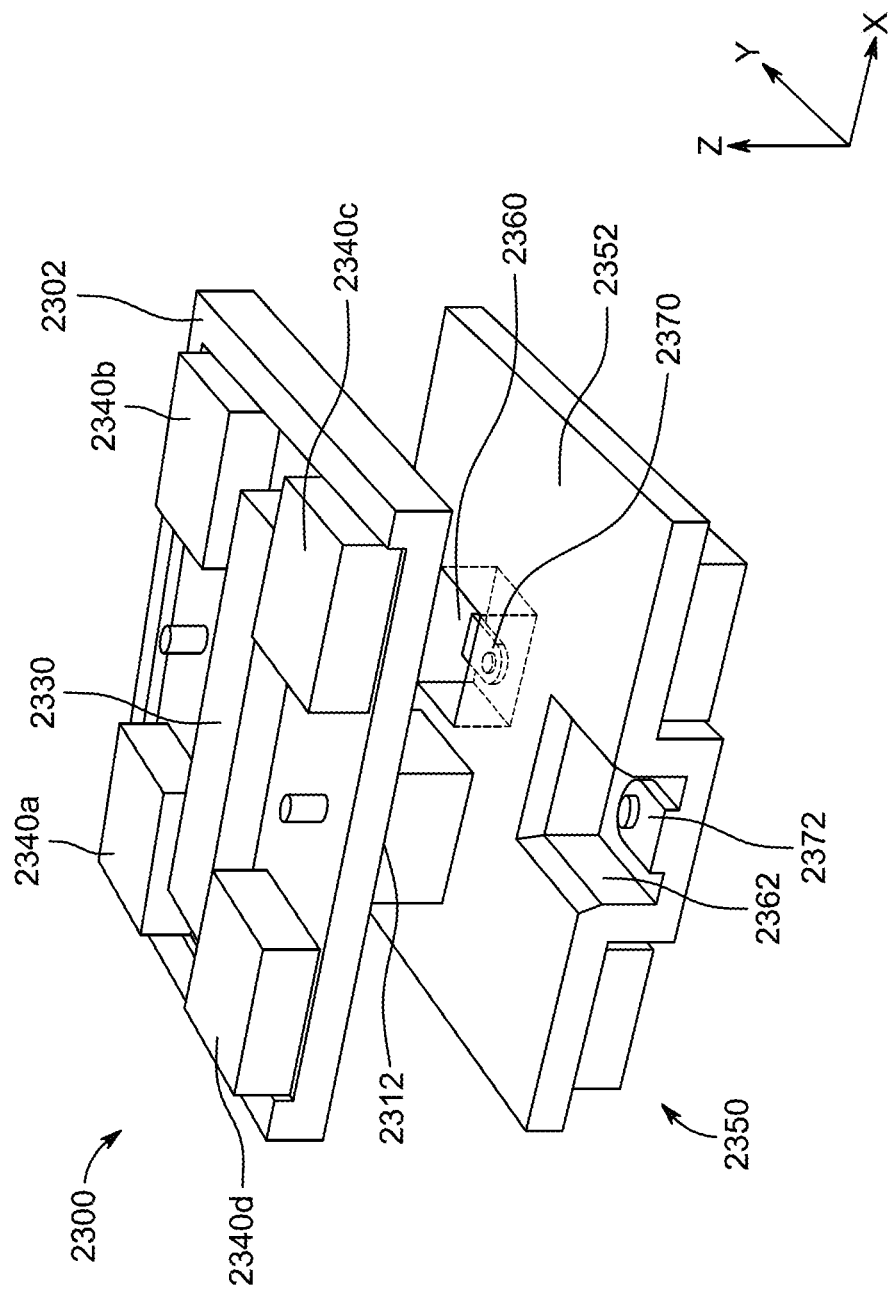

FIGS. 23A and 23B show different illustrative views of connectors 2300 and 2350, according to an embodiment. FIGS. 23A-23B will be collectively referred to herein. Connectors 2300 and 2350 use several protrusion members and several cavities to achieve CCU alignment and electrical connections. Connector 2300 can include substrate 2302, protrusion members 2310 and 2312, contacts 2320 and 2322, magnet 2330, and CCUs 2340*a-d*. Connector 2350 can include substrate 2352, cavities 2360 and 2362, contacts 2370 and 2372, a magnet (not shown), and CCUs 2390*a-d*. Substrates 2302 and 2352 may represent housings of their respective connectors 2300 and 2350. In addition, substrates 2302 and 2352 may abut either of the major faces of connectors 2300 and 2350 and serve as mounting points for CCUs. When connectors 2300 and 2350 are coupled together, the alignment provided by the interfacing of protrusion members 2310 and 2312 with cavities 2360 and 2362 ensures that CCUs 2340*a-d* are optimally aligned with CCUs 2390*a-d*, respectively. Any number of CCUs can be placed on connectors 2300 and 2350. For example, in connector 2300, the CCUs can be placed on a top surface or bottom surface of substrate 2302, within substrate 2302, or within protrusion members 2310 and 2312. Similarly, in connector 2350, the CCUs can be placed on a top surface or bottom surface of substrate 2352, within substrate 2352, or within cavities 2360 and 2362. In some embodiments, the position of the magnets and CCUs can be switched.

The contacts in connectors 2300 and 2350 may rely on perpendicular contact force or axial contact force, both of which were discussed above. Contacts 2320 and 2322 may be incorporated into protrusion members 2310 and 2312, respectively, and contacts 2370 and 2372 may be incorporated into cavities 2360 and 2362, respectively. Magnet 2330 may be arranged along the x-axis between CCUs 2240*a* and 2240*d* and between CCUs 2240*b* and 2240*c*, and between protrusion members 2310 and 2312. The magnet(s) associated with connector 2350 may be arranged along the x-axis between CCUs 2290*a* and 2290*d* and between CCUs 2290*b* and 2290*c*, and between cavity members 2360 and 2362. In another embodiments, the magnets may be constructed to fit around the periphery of both connectors, the magnets may be placed on or the near the sides of the connectors, or the magnets can be integrated into the protrusion members and the cavities.

Protrusion member 2310 and protrusion member 2312 may be spaced apart by the same distance that cavities 2360 and 2362 are spaced apart. The gap separation between members 2310 and 2312 and cavities 2360 and 2362 may accommodate any number of CCUs to be placed on connectors 2300 and 2350. Only four CCUs are shown on each connector, but if the gap is increased, for example, additional CCU may be incorporated therein. In some embodiments, three or more protrusion members may be constructed to interface with three or more cavities.

It should be understood that the CCUs associated with connectors 2300 and 2350 may be placed on one or more circuit boards that are mounted a fixed distance away from a housing and/or the connector, similar to the embodiment shown in FIG. 19C. Thus, the teachings of FIGS. 12B-12D, 12F, 12G, and 19 can be applied to connectors 2300 and 2350.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-23, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A first device comprising:
   a first connector configured to interface with a second connector associated with a second device, the first connector comprising:
   an integrated power and alignment cavity structure configured to establish an electrical connection and to align at least one extreme high frequency (EHF) electromagnetic (EM) signal transmission path between the first device and the second device, the integrated power and alignment cavity structure comprising:
   an alignment cavity to receive the second connector, the alignment cavity including a plurality of vertical walls extending vertically from a surface of the alignment cavity;
   a first electrical contact coupled to a first one of the plurality of vertical walls; and
   a second electrical contact coupled to a second one of the plurality of vertical walls, the first electrical contact and the second electrical contact configured to establish electrical connection with the second connector; and
   at least one contactless communications unit (CCU) arranged in a position external to the integrated power and alignment cavity structure, the at least one CCU of the first device positioned to be aligned to a respective one of at least one CCU of the second device to establish alignment of the at least one EHF EM signal transmission path.

2. The first device of claim 1, wherein the alignment cavity is configured to accommodate one of a symmetric and asymmetric connection between the first and second connectors.

3. The first device of claim 1, wherein each of the first electrical contact and the second electrical contact comprises a retention receiving portion designed to interface with a retention engagement member of the second connector, wherein the retention receiving portion comprises an undercut.

4. The first device of claim 1, wherein the first vertical wall is opposite of the second vertical wall.

5. The first device of claim 1, wherein the first electrical contact is a power contact and the second electrical contact is a ground contact.

6. The first device of claim 1, wherein the first connector further comprises at least one magnet operative to provide a retention force that secures the first and second connectors together.

7. The first device of claim 6, wherein the at least one magnet is positioned within the alignment cavity.

8. The first device of claim 6, wherein the at least one magnet is positioned outside the alignment cavity.

9. A first connector comprising:
   an integrated power and alignment structure configured to establish an electrical connection and to align at least one extreme high frequency (EHF) electromagnetic (EM) signal transmission path between the first connector and a second connector, the integrated power and alignment structure comprising:
   an alignment member operative to interface with a counterpart alignment member of the second connector; and
   a plurality of contacts arranged in an N×M matrix within the alignment member, wherein the plurality of contacts exhibit a contact force in the same direction as a coupling direction between the first and second connectors, wherein N is an integer of 1 or higher and M is an integer of 1 or higher between the first and second connectors;
   at least one contactless connector unit (CCU) arranged in a position external to the integrated power and alignment structure, the at least one CCU of the first connector positioned to be aligned to a respective one of at least one CCU of the second connector to establish alignment of the at least one EHF EM signal transmission path; and
   at least one magnet configured to provide a retention force that secures the first and second connectors together and to overcome the contact force of the plurality of contacts.

10. The first connector of claim 9, wherein the alignment member is a protrusion member, and wherein the plurality of contacts are spring biased pogo pins.

11. The first connector of claim 9, wherein the alignment member is a channel cavity, and wherein the plurality of contacts are flat metal contacts.

12. A multiple protrusion connector for use in being connected to a multiple cavity connector, the multiple protrusion connector comprising:
   a plurality of integrated power and alignment structures configured to establish an electrical connection and to align extreme high frequency (EHF) electromagnetic (EM) signal transmission paths between the multiple protrusion connector and the multiple cavity connector, wherein the plurality of integrated power and alignment structures comprise two integrated power and alignment structures that are aligned along a center axis of the multiple protrusion connector and that are spaced apart by a fixed distance along the center axis, and each of the integrated power and alignment structures comprising:
- a protrusion member operative to interface with a counterpart cavity of the multiple cavity connector; and
- a contact integrated within the protrusion member, the contact configured to establish the electrical connection with the multiple cavity connector;

at least two contactless communication units (CCUs) arranged along an axis that is parallel to and offset with respect to the center axis such that the at least two CCUs of the multiple protrusion connector are aligned to respective ones of at least two CCUs of the multiple cavity connector, wherein the at least two CCUs arranged in a position external to the integrated power and alignment structures; and at least one magnet configured to provide a retention force that secures the multiple protrusion and multiple cavity connectors together.

13. The multiple protrusion connector of claim 12, wherein the at least one magnet is aligned along an axis perpendicular to the center axis.

14. A multiple cavity connector for use in being connected to a multiple protrusion connector, the multiple cavity connector comprising:

a plurality of integrated power and alignment structures configured to establish an electrical connection and to align extreme high frequency (EHF) electromagnetic (EM) signal transmission paths between the multiple protrusion connector and the multiple cavity connector, wherein the plurality of integrated power and alignment structures comprise two integrated power and alignment structures that are aligned along a center axis of the multiple cavity connector and that are spaced apart by a fixed distance along the center axis, and each of the integrated power and alignment structures comprising:
- a cavity operative to interface with a counterpart protrusion member of the second connector; and
- a contact integrated within the cavity;

at least two contactless communication units (CCUs) arranged along an axis that is parallel and offset with respect to the center axis such that the at least two CCUs of the multiple protrusion connector are aligned to respective ones of at least two CCUs of the multiple cavity connector, wherein the at least two CCUs arranged in a position external to the integrated power and alignment structures; and at least one magnet configured to provide a retention force that secures the multiple protrusion and multiple cavity connectors together.

* * * * *